(12) United States Patent
Stradling et al.

(10) Patent No.: US 10,740,844 B2
(45) Date of Patent: Aug. 11, 2020

(54) SYSTEM AND METHOD OF MANAGING TRUSTLESS ASSET PORTFOLIOS

(71) Applicant: ShapeShift AG, Zug (CH)

(72) Inventors: Adam Stradling, Berlin (DE); Erik Voorhees, Denver, CO (US)

(73) Assignee: ShapeShift AG (CH)

( * ) Notice: Subject to any disclaimer, the term of this patent is extended or adjusted under 35 U.S.C. 154(b) by 391 days.

(21) Appl. No.: 15/715,663

(22) Filed: Sep. 26, 2017

(65) Prior Publication Data

US 2018/0089759 A1  Mar. 29, 2018

Related U.S. Application Data

(60) Provisional application No. 62/399,763, filed on Sep. 26, 2016, provisional application No. 62/453,416, (Continued)

(51) Int. Cl.
*G06Q 40/00* (2012.01)
*G06Q 40/06* (2012.01)
(Continued)

(52) U.S. Cl.
CPC ......... *G06Q 40/06* (2013.01); *G06F 12/1408* (2013.01); *G06Q 20/3829* (2013.01);
(Continued)

(58) Field of Classification Search
CPC .................................................... G06Q 40/00
See application file for complete search history.

(56) References Cited

U.S. PATENT DOCUMENTS

2010/0106653 A1* 4/2010 Sandholm ............. G06Q 40/00
705/80
2012/0310790 A1* 12/2012 Curd ..................... G06O 30/04
705/27.1
(Continued)

FOREIGN PATENT DOCUMENTS

WO  2017190175 A1  11/2017

OTHER PUBLICATIONS

Ian Grigg, On the intersection of Ricardian and Smart Contracts, https://iang.org/papers/intersection_ricardian_smart.html, Feb. 2015, web, 1-13 (Year: 2015).*

(Continued)

*Primary Examiner* — I Jung Liu
(74) *Attorney, Agent, or Firm* — Sanderson IP Law, Ltd.

(57) ABSTRACT

In some examples, a system or method of implementing a smart contract on a blockchain can involve receiving an indication of a portfolio of assets, an amount from a buyer to invest in the portfolio, a number of assets in the portfolio that is based on exchange rates and the amount to invest, and a confirmation from the buyer of the number of assets. The system or method can involve calculating a cost of the portfolio to yield a contract, receiving the amount and excess collateral from the buyer as a buyer acceptance of the contract, and an entity acceptance of the contract including an entity amount. The system or method can involve receiving, at the smart contract, a request from the buyer to close the contract, and settling the contract via the smart contract at a current value of the portfolio based on pricing data from a valuation entity.

20 Claims, 13 Drawing Sheets

Related U.S. Application Data filed on Feb. 1, 2017, provisional application No. 62/453,350, filed on Feb. 1, 2017, provisional application No. 62/453,379, filed on Feb. 1, 2017, provisional application No. 62/453,384, filed on Feb. 1, 2017.

(51) Int. Cl.

| | | |
|---|---|---|
| *H04L 9/32* | (2006.01) | |
| *G06Q 20/38* | (2012.01) | |
| *G06Q 30/06* | (2012.01) | |
| *G06Q 40/04* | (2012.01) | |
| *G06F 12/14* | (2006.01) | |
| *G06Q 50/18* | (2012.01) | |
| *H04L 29/06* | (2006.01) | |
| *H04L 29/08* | (2006.01) | |
| *G06Q 30/00* | (2012.01) | |

(52) U.S. Cl.
CPC ......... *G06Q 30/0641* (2013.01); *G06Q 40/00* (2013.01); *G06Q 40/04* (2013.01); *G06Q 50/188* (2013.01); *H04L 9/3236* (2013.01); *H04L 9/3268* (2013.01); *H04L 9/3297* (2013.01); *H04L 63/105* (2013.01); *H04L 67/26* (2013.01); *G06Q 30/018* (2013.01); *G06Q 2220/00* (2013.01); *H04L 2209/38* (2013.01); *H04L 2209/56* (2013.01)

(56) References Cited

U.S. PATENT DOCUMENTS

| | | |
|---|---|---|
| 2014/0081793 A1 | 3/2014 | Hoffberg |
| 2014/0279526 A1 | 9/2014 | Jackson |
| 2015/0170112 A1 | 6/2015 | DeCastro |
| 2015/0220928 A1 | 8/2015 | Allen |
| 2015/0379510 A1 | 12/2015 | Smith |
| 2016/0028552 A1 | 1/2016 | Spanos et al. |
| 2016/0098723 A1 | 4/2016 | Feeney |
| 2016/0261411 A1 | 9/2016 | Yau et al. |
| 2016/0357550 A1 | 12/2016 | Thomas |
| 2017/0012780 A1 | 1/2017 | Kaliski |
| 2017/0061398 A1 | 3/2017 | Joseph |
| 2017/0155515 A1 | 6/2017 | Androulaki |
| 2017/0295023 A1 | 10/2017 | Madhavan |
| 2017/0301047 A1 | 10/2017 | Brown |

OTHER PUBLICATIONS

Szabo, Nick, "A formal language for analyzing contracts" (nszabo@law.gwu.edu).

Jones, et al., "An Adventure in Financial Engineering" ICFP Montreal (Canada).

International Search Report of the International Bureau, US International Searching Authority in counterpart case PCT/US17/053431 dated Dec. 11, 2017.

First Written Opinion of the International Bureau, US International Searching Authority in counterpart case PCT/US17/053431 dated Dec. 11, 2017.

Second Written Opinion of the International Bureau, US International Searching Authority in counterpart case PCT/US17/053431 dated Oct. 11, 2018.

International Search Report of the International Bureau, US International Searching Authority in counterpart case PCT/US17/053437 dated Dec. 11, 2017.

First Written Opinion of the International Bureau, US International Searching Authority in counterpart case PCT/US17/053437 dated Dec. 11, 2017.

Second Written Opinion of the International Bureau, US International Searching Authority in counterpart case PCT/US17/053437 dated Oct. 15, 2018.

\* cited by examiner

PORTFOLIO PURCHASE SUMMARY

| PORTFOLIO VALUE | ASSETS ⇅ | PERCENT ⇅ | AMOUNT ⇅ |
|---|---|---|---|
| 1.0 BITCOIN | LITCOIN | 10% | 12.633 LTC |
| $408.00 USD | RIPPLE | 10% | 7471.88 XRP |
| 1.0 ETH | ETHEREUM | 30% | 787.11 ETH |
| 1.0 DASH | DASH | 50% | 383.76 DASH |

YOU HAVE 12:15 MINS LEFT TO PAY:

BUY YOUR PORTFOLIO

PAYMENT DETAILS

PLEASE SEND 1 ETH TOO:

3QJmV3qfvL9SuYo34ihAf3sRCW3qSinyC

WARNING! WARNING! WARNING! WARNING! YOU MUST RETAIN THE PRIVATE KEYS OF THE ADDRESS FROM WHICH YOU MAKE THE PAYMENT. WHEN YOU CHOSE TO SELL YOUR PORTFOLIO, THE BITCOINS WILL BE SENT TO THIS ADDRESS TO LEARN MORE READ OUR TERMS HERE.

FIG. 4

PORTFOLIO SUMMARY

| CURRENT VALUE | INITIAL VALUE | ASSETS ⇔ | PERCENT ⇔ | AMOUNT ⇔ | CURRENT RATE (/BTC) ⇔ | GAIN/LOSS % |
|---|---|---|---|---|---|---|
| 1.50 BITCOIN | 1.0 BITCOIN | LITCOIN | 10% | 12.633 LTC | 113.40 LTC | -10% |
| $672.00 USD | $408.00 USD | RIPPLE | 10% | 7471.88 XRP | 8222.36 XRP | +10% |
| 1 ETH | 1 ETH | ETHEREUM | 30% | 787.11 ETH | 262.37 ETH | +0% |
| 2 DASH | 1 DASH | DASH | 50% | 383.76 DASH | 95.94 DASH | +100% |

602

PORTFOLIO ACTIONS:

| REBALANCE ▽ |
|---|
| SHARE |
| ADD TO LeaderBoards |
| SELL |

```
Tweets          Tweets & Replies          Photos & Videos

☒   Erik Retweeted lisa_lisa – 4h
    Creating a new token is really easy on our mobile wallet. You can even
    buy XCP within the wallet via@ShapeShift_io @Erik
    ↰         ↻ 3              ● 1     ○ ○ ○         View conversation Erik @Erik – 4h
    My portfolio was at the top of the Leader Boards this week! Nailed the
    DASH doubling. Find it, here: http://example.xyz
    ↰         ↻ 1              ● 4     ○ ○ ○         View conversation Erik @Erik – 4h
    Cryptocurrency markets been cray cray. View, buy or sell all the top
    coins direct at coincap.io #bitcoin #ethereum #litecoin
    ↰         ↻ 5              ● 10    ○ ○ ○
```

800

802

LEADER BOARDS FOR PUBLIC PORTFOLIOS

| OWNER | PORTFOLIO NAME ⇔ | TOTAL RETURN ⇔ | WEEK ⇔ | MONTH ⇔ | YEAR ⇔ |
|---|---|---|---|---|---|
| USER A | MY TOP FIVE CRYPTOS | 50% | 50% | NO | NO |
| USER B | MY TOP 20 CRYPTOS | 250% | 42% | 106% | NO |
| USER C | MOST MarketCap CRYTOS | 550% | 39% | 145% | 350% |
| USER D | ETF MarketCap WEIGTH TOP 20 | 246% | 31% | 85% | 241% |
| USER D | ETF INVERSE MarketCap TOP 20 | 110% | 22% | 96% | NO |
| USER E | ACTIVELY TRADED – SHORT TERM | 150% | 17% | 52% | 75% |
| USER E | ACTIVELY TRADED – LONG TERM | 249% | 6% | 82% | 45% |

CLICK TO CLONE AND FOLLOW THE PORTFOLIO

*FIG. 10*

SYSTEM AND METHOD OF MANAGING TRUSTLESS ASSET PORTFOLIOS

CROSS-REFERENCE TO RELATED APPLICATIONS

This application claims the benefit of, and priority to, U.S. Provisional Patent Application No. 62/399,763, filed on Sep. 26, 2016, U.S. Provisional Patent Application No. 62/453,416, filed on Feb. 1, 2017, U.S. Provisional Patent Application No. 62/453,350, filed on Feb. 1, 2017, U.S. Provisional Patent Application No. 62/453,379, filed on Feb. 1, 2017, U.S. Provisional Patent Application No. 62/453,384, filed on Feb. 1, 2017, the entire contents of each of which are herein incorporated by reference in their entireties.

TECHNICAL FIELD

The present disclosure relates to implementing financial swaps as a smart contract on a blockchain in the context of multi-asset portfolios.

BACKGROUND

In traditional approaches to asset management, assets are typically held by entities in a custodial manner. This creates a risk to the buyer, as the buyer's assets are subject to any errors or improprieties by the entities in custody of the assets, such as fraud, forged data, deleted data, and so forth. An enormous legal and regulatory structure exists to prevent, detect, and dissuade such errors by setting forth processes and rules for record keeping of company data, such as documents, emails, transactions, contracts, etc., and setting forth specific disclosure and fiduciary requirements.

Financial institutions are also subject to frequent audits designed to ensure those records and processes accurately represent the firm's assets, liabilities, and operations. Despite the frequent audits and the legal and regulatory structure that exists, fraud and insolvency cases occur across the entire landscape of asset management with surprising regularity. The continual failure to prevent these issues highlights the risks inherent in using third parties to manage assets. Current technologies similarly fail to prevent these issues.

BRIEF DESCRIPTION OF THE DRAWINGS

The disclosure will be readily understood by the following detailed description in conjunction with the accompanying drawings in which:

FIG. 4 illustrates an example graphical interface for buying a portfolio of assets;

FIG. 6 illustrates an example graphical interface for viewing the current composition, status, and value of a portfolio of assets selecting portfolio actions;

FIG. 8 illustrates an example graphical interface for sharing a portfolio of assets with users on a network;

FIG. 10 illustrates an example graphical interface for providing leader boards based on various portfolios of assets;

DESCRIPTION OF EXAMPLE EMBODIMENTS

Overview

Figure 1:
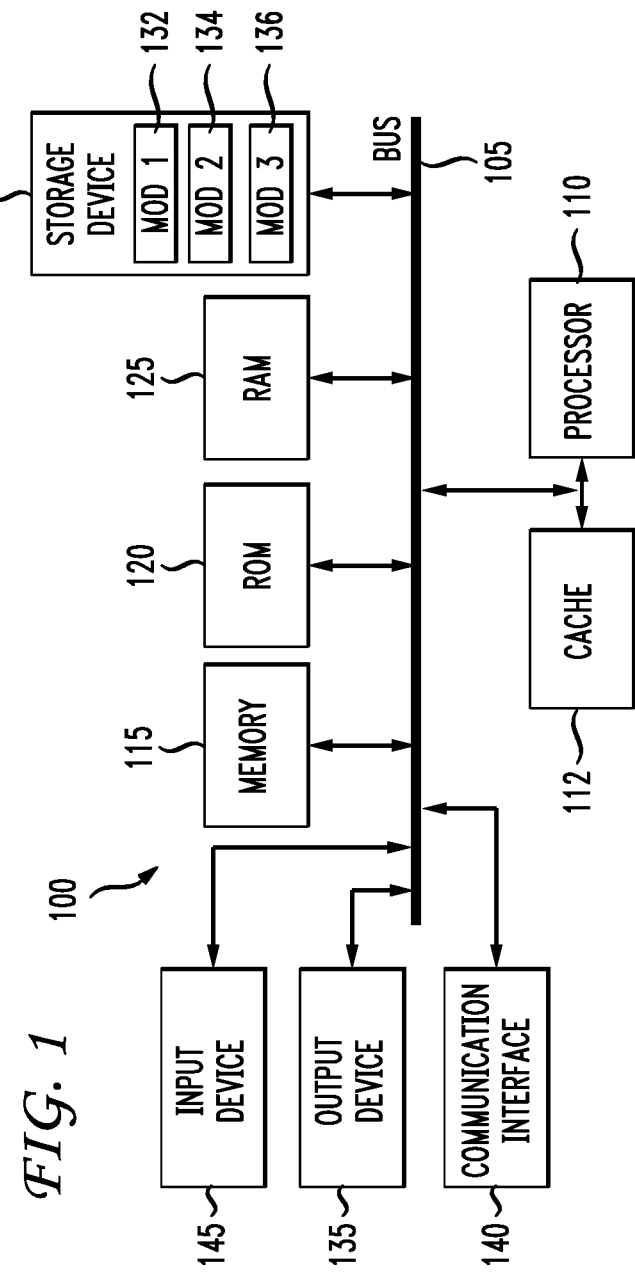
FIG. 1 illustrates example components of a computing device according to some aspects of this disclosure.

Blockchain technology can reduce or eliminate the risks in asset management. Blockchain technologies depend on the existence of a network like the Internet, and allow users to exchange assets such as digital currency using a decentralized verification system over multiple servers. The process for buying, securing/storing and vetting blockchain assets has many technical steps and challenges. Any investor who wants to build a portfolio of blockchain assets should conduct in-depth research and analysis into which blockchain assets are quality investments, research and register at multiple asset exchanges to purchase blockchain assets, securely generate and store the private keys for each blockchain asset the investor wants to purchase, and buy or sell assets when the investor wants to change the composition of the portfolio.

Previous solutions for trading assets allow users to gain exposure to thousands of available tickers (like stocks, bonds, currencies, etc.). Such applications are designed for tickers to be traded on a "single asset basis". That is, each and every swap is for a single asset (i.e. Apple for IBM, or USD for Euros, etc.). The bitcoin blockchain system can be used for blockchain assets and cryptocurrencies. However, the bitcoin blockchain system requires a wallet for every asset. The wallet stores the user's private key and address for that asset. For every different type of cryptocurrency, a user must download the respective wallet that stores a private key and an address for that user. This requirement for a separate wallet, private key, etc. for each type of blockchain asset is cumbersome, and creates significant technical limitations and burdens pertaining to data storage, bandwidth, digital security, computing efficiency, software and data compatibility, etc.

The disclosed technologies provide a technical solution to address the limitations and burdens pertaining to data storage, bandwidth, digital security, computing efficiency, software and data compatibility, and provides various technical advantages which eliminate or reduce asset management risks and other limitations. For example, the concepts disclosed herein can reduce or eliminate the risks of custodianship in the blockchain asset trading world and beyond, including the broader financial services and investment management industries.

Disclosed herein are technologies and applications for blockchain-based smart contract driven asset management. The approaches disclosed herein allow users to: (1) Build a portfolio of blockchain assets from a user-friendly interface, (2) Purchase an entire portfolio in a single transaction (i.e., rather than a single asset basis transaction, transactions can involve a plurality of assets being acquired in a single step), (3) Secure the entire portfolio under a single private key, which only the investor controls, from beginning to end (i.e. no custodial or counterparty risk), (4) Manage and maintain multiple blockchain assets and asset types without storing and managing a different wallet for each type of the blockchain assets, (5) Rebalance the portfolio as desired through a single signed transaction, (6) Leverage the collective knowledge of the crowd to "socially" design a crypto portfolio, (7) Manage a portfolio of assets and "follow" top blockchain asset portfolio managers and traders without giving up custody of their assets—a new type of asset management process, and (8) Store, trade, and manage an entire group of assets using a single private key.

The approaches set forth herein provide secure and efficient technologies and procedures for managing a portfolio of blockchain assets. The approaches herein can implement a distributed architecture for hosting a blockchain and distributed information which together can enhance asset and portfolio information, asset and information security, and user control and flexibility. The process outlined herein can also reduce costs.

With this technology, users can own and manage portfolios of blockchain assets using the blockchain, smart contracts, and related infrastructure disclosed herein. Users do not need to keep coins on an exchange or even interface with an exchange. In addition, users do not need to download the wallets/clients of any specific blockchain asset which they want to purchase and store.

While the description herein focuses on blockchain assets, it should be noted that the technologies herein can also be used to manage non-blockchain assets and build portfolios with non-blockchain assets, such as stocks, bonds, real estate, contracts, leases, and any other types of assets. The technologies herein can be used to build portfolios of any assets having pricing data-feeds. The benefits and use cases for building non-blockchain asset portfolios can vary from those associated with building blockchain asset portfolios. This is due at least in part to the differences in the infrastructure and industry associated with these types of assets.

The approaches disclosed herein provide significant advantages of transparency and auditability. In the present disclosure, "the contract is the code," which means that using blockchain technology and smart contracts everything is transparent and secured by the laws of cryptography. Individuals cannot forge, erase or add data inappropriately. The system provides complete transparency in view of who owns the assets and their providence over time. This new system provides a new infrastructure with greater cybersecurity and overall security, and eliminates the need to trust others and rely on third parties to be honest. The smart contract is a compute protocol intended to facilitate, verify or enforce the negotiation and the performance of a contract.

The computer code or code referenced herein represents the intent of parties to the smart contract. The smart contract as implemented herein reduces the amount of interpretation with respect to the contract and terms by establishing that the computer code is a literal manifestation of the intent of the parties, thus avoiding ambiguity.

A multi-asset swap option disclosed herein limits or eliminates the risk inherent in the use of financial swap arrangements which require trusting one or more parties to deliver or satisfy obligations upon settlement, known as performance. Every swap has counterparty risk, and this risk is priced and paid ultimately by one or more parties in the arrangement. Not having mathematical certainty of performance in the swap contract is an unnecessary loss to all involved in the contract.

The problems outlined above, among others, are addressed by the concepts disclosed herein. For example, the approaches disclosed herein can implement a blockchain-based smart contract paired with an oracle data feed in which the performance and settlement of the swap arrangement occurs autonomously and without risk to either party. Both parties, when they enter in the contract, know with mathematical certainty that the other side does not need to perform anything. With the approaches herein, there is no counterparty risk and no need for a clearing house. The blockchain-based smart contract creates an auditable, transparent trail and the code executes the intent of the parties. This reduces the likelihood of failure to perform, reduces costs, eliminates non-performance risks, and reduces the cost of entering, managing, and executing a swap agreement.

As previously noted, the need for a central clearinghouse is eliminated by the technologies herein. In the derivatives world, there are over-the-counter (OTC) derivatives which can be an agreement directly between the two parties. In that case, the parties have counterparty risk should one or the other party not fulfill their obligations. In the case where both parties employ the services of a clearinghouse as a trusted third party, there is always a risk that the trusted third party may not manage and enforce the swap. The approaches herein eliminate the risks in both scenarios above, as well as their associated costs. Again, in the disclosed solution, there is no need for a clearinghouse, and in the OTC scenario, both parties do not have trust each other thus eliminating any counterparty risk.

The disclosure herein describes a variety of examples and features in accordance with one or more aspects of the technologies herein. Non-limiting examples and aspects of the technologies herein include, without limitation, a trustless blockchain multi-asset "swaption" mechanism, a multi-asset trustless swap rebalance mechanism, a trustless multi-asset leader-follower mechanism, a contract creator mechanism and a multi-validator oracle. One or more of these individual examples or features can be combined and work together with any other examples or features herein, to form a specific application or configuration in accordance with the technologies herein. For example, one or more of the components disclosed herein can be combined or work together to create a portfolio index swap marketplace (hereinafter "Prism" or "trustless asset groups"). In some examples, "Prism" refers to an application and service that enables buying and selling of multi-asset portfolios based on blockchain technology and smart contracts.

A number of examples will be provided related to blockchain assets or cryptocurrencies, such as Bitcoins, Ethereum, and other digital currencies and assets. However, it is noted that the concepts herein apply to portfolios of any type of blockchain asset, digital currency or asset, and/or non-blockchain assets such as stock equities, bonds, commodities, real estate, contracts, currencies (e.g., dollars), etc.

As previously noted, with the technologies herein, users do not have to keep assets on an exchange, or interface with an exchange, third party or counterparty. This eliminates significant risks such as fraud, non-performance, breach of duty, theft, etc. Moreover, users do not have to download specific wallets or clients for respective blockchain assets that users want to purchase and store. Instead, users can own and manage one or more portfolios of assets, each of which can include a variety of assets such as blockchain assets and/or "traditional assets" (e.g., equities and bonds), using a blockchain and associated security features like public/private key infrastructure. Each individual portfolio is secured using the public/private key infrastructure and transactions are verified using the blockchain.

In this respect, the present technologies provide a new computing infrastructure, environment, and procedure for managing digital assets and multi-asset portfolios, with significant improvements over existing technologies and procedures, including technologies and procedures for data storage, security, management, communication, efficiency, etc. The new computing infrastructure, environment, and procedure provide distributed data storage, enhancement, security, control, processing, verification, etc., and enhance the information and functionality of data and systems across the distributed environment.

Current blockchain technologies are designed for trading single assets and are incapable of performing multi-asset transactions or managing portfolios of different types of assets, such as blockchain assets and non-blockchain assets (e.g., real-world assets). However, the present technologies address these limitations and provide various other improvements to blockchain and non-blockchain technologies, including flexibility, security, and performance improvements. For example, the present technologies provide a multi-asset solution which allows portfolios to be built with different types of assets and enables swaps of entire portfolios as opposed to merely single asset transactions.

The present technologies also implement a smart contract based oracle through which the smart contract can receive and validate pricing data, including multi-sig, multi-validation, or fully decentralized, all of which are outlined herein. In a multi-sig context, rather than using a single private key to authorize the transaction, the system uses multiple private keys to sign the transaction together before the transaction happens. The system can require a number of keys which can vary in different configurations, such as 2 out of 3 possible private keys to verify the transaction or 99 out of 100, or 3 out of 8, and so forth. The multi-structure arrangement removes a point of failure from the process and provides a safer transaction. This can apply to the oracle disclosed herein and/or to other components.

The present technologies also provide a unique leader-follower functionality along with various benefits including mitigation of custodial risk. Unlike current solutions, the present technologies also provide the architecture and functionality for enabling in-contract rebalancing of a portfolio of assets, which can be performed for the entire portfolio without opening and closing every single asset swap each time the user wants to rebalance the portfolio. The present technologies also provide an architecture and environment that integrates a social networking component. For example, with the disclosed technologies, users can share their portfolio with other users on one or more networks, such as a social network. Users can also view and select portfolios from other users in order to follow selected portfolio(s) from other users.

The present technologies can be deployed using different platforms and environments, including desktop applications, browser applications, etc., and are not limited to a specific platform. The present technologies also provide an array of smart contract security features, such as the ability to "pause contracts", "manually override contracts", etc., as well as a "training wheels" method as further described herein. In some aspects of the present disclosure, only the buyer can initiate settlement, which can prevent settlements being triggered without the buyer's consent, such as based on margin calls, the expiration of time, or by the seller. The buyer has the option to settle a swap at any time and the seller can be prevented from triggering a settlement. This can provide significant security and usability implications.

The technologies disclosed herein also provide a new architecture and code-base which allows for a unique "leader and follower utility." This functionality allows a "leader" to invest or allocate digital assets corresponding to "followers", without taking custody of those assets. This feature and functionality eliminates typical custodial arrangements and their associated risks. With the disclosed technologies, a third party does not have to take custody of client assets. Instead, users retain possession of their assets, which can be aggregated into "portfolios" stored and/or verified using a blockchain network. Portfolios can include various types of blockchain assets (e.g., cryptocurrencies, etc.), as well as other non-blockchain assets.

A uniquely implemented blockchain-based oracle, which can provide current pricing information, can be used as a data feed in the present application. This oracle and its configuration in the present application can include a number of security features, such as a "manual override", "contract-pause", "training wheels" processes, etc.

The present disclosure includes systems, methods, and computer-readable storage devices for implementing blockchain-based smart contracts for asset management, including trustless blockchain swaption contracts of multi-asset portfolios for example. In some examples, a system or method can include receiving, from a buyer and at a smart contract, an identification of a portfolio of blockchain assets (e.g., digital currencies such as Bitcoin or Ethereum), receiving, from the buyer, an amount that the buyer will invest in the portfolio of blockchain assets and receiving, based on prevailing exchange rates, a number of blockchain assets in the portfolio.

The system or method further includes receiving a confirmation from the buyer of the portfolio having the number of blockchain assets, calculating, by an entity, a cost of the portfolio of blockchain assets to yield a portfolio contract, receiving the amount and excess collateral from the buyer as a buyer acceptance of the portfolio contract, and receiving an entity acceptance of the contract by receiving an amount from the seller or other entity (i.e., an asset value amount such as a value in dollars or value of cryptocurrency) at the smart contract. Private keys of a sending address associated with the entity can be used as an entity signature key for the portfolio contract.

The system or method further includes receiving, at the smart contract, an indication that the buyer wants to close the portfolio contract. This indication can be associated with a signed message from a buyer private key. The system or method can also include settling the arrangement via the smart contract based on a current value of the portfolio, which can be calculated based on pricing data received from a trusted valuation entity, such as the oracle or another source.

DESCRIPTION

The present disclosure addresses the various issues and limitations in the art outlined above, such as security limitations, performance limitations, inefficiencies, control limitations, flexibility limitations, lack of transparency, infrastructure limitations, etc. Example features and functionalities of the present disclosure include trustless blockchain multi-asset swaption mechanisms, trustless multi-asset rebalance mechanisms, trustless multi-asset leader-follower mechanisms, smart-contract creator mechanisms for blockchain networks, multi-validator oracle systems for data and validation, etc. These example features and functionalities can be implemented in a distributed network and computing environment which can provide various advantages in security, storage, efficiency, bandwidth, computation, control, flexibility, performance, etc., and can support a variety of software application and computing platforms. One or more of these individual components can be combined and work together with any other components in various configurations.

The disclosure first turns to FIG. 1 which illustrates example hardware components for a computing system that can be implemented for various aspects of the present disclosure. The disclosure will then turn to a description of example multi-asset management mechanisms, architectures, and concepts.

With reference to FIG. 1, an exemplary system and/or computing device 100 includes a processing unit (CPU or processor) 110 and a system bus 105 that couples various system components including the system memory 115 such as read only memory (ROM) 120 and random access memory (RAM) 125 to the processor 110. The system 100 can include a cache 112 of high-speed memory connected directly with, in close proximity to, or integrated as part of the processor 110. The system 100 copies data from the memory 115, 120, and/or 125 and/or the storage device 130 to the cache 112 for quick access by the processor 110. In this way, the cache provides a performance boost that avoids processor 110 delays while waiting for data. These and other modules can control or be configured to control the processor 110 to perform various operations or actions. Other system memory 115 may be available for use as well. The memory 115 can include multiple different types of memory with different performance characteristics. It can be appreciated that the disclosure may operate on a computing device 100 with more than one processor 110 or on a group or cluster of computing devices networked together to provide greater processing capability.

The processor 110 can include any general purpose processor and a hardware module or software module, such as module 1 132, module 2 134, and module 3 136 stored in storage device 130, configured to control the processor 110 as well as a special-purpose processor where software instructions are incorporated into the processor. The processor 110 may be a self-contained computing system, containing multiple cores or processors, a bus, memory controller, cache, etc. A multi-core processor may be symmetric or asymmetric. The processor 110 can include multiple processors, such as a system having multiple, physically separate processors in different sockets, or a system having multiple processor cores on a single physical chip. Similarly, the processor 110 can include multiple distributed processors located in multiple separate computing devices, but working together such as via a communications network. Multiple processors or processor cores can share resources such as memory 115 or the cache 112, or can operate using independent resources. The processor 110 can include one or more of a state machine, an application specific integrated circuit (ASIC), or a programmable gate array (PGA) including a field PGA.

The system bus 105 may be any of several types of bus structures including a memory bus or memory controller, a peripheral bus, and a local bus using any of a variety of bus architectures. A basic input/output system (BIOS) stored in ROM 120 or the like, may provide the basic routine that helps to transfer information between elements within the computing device 100, such as during start-up. The computing device 100 further includes storage devices 130 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 130 is connected to the system bus 105 by a drive interface. The drives and the associated computer-readable storage devices provide non-volatile storage of computer-readable instructions, data structures, program modules and other data for the computing device 100. In one aspect, a hardware module that performs a particular function includes the software component stored in a tangible computer-readable storage device in connection with the necessary hardware components, such as the processor 110, bus 105, an output device such as a display 135, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the computing device 100 is a small, handheld computing device, a desktop computer, or a computer server. When the processor 110 executes instructions to perform "operations", the processor 110 can perform the operations directly and/or facilitate, direct, or cooperate with another device or component to perform the operations.

Although the exemplary embodiment(s) described herein employs a storage device such as a hard disk 130, other types of computer-readable storage devices which can store data that are accessible by a computer, such as magnetic cassettes, flash memory cards, digital versatile disks (DVDs), cartridges, random access memories (RAMs) 125, read only memory (ROM) 120, a cable containing a bit stream and the like, may also be used in the exemplary operating environment. According to this disclosure, tangible computer-readable storage media, computer-readable storage devices, computer-readable storage media, and computer-readable memory devices, expressly exclude media such as transitory waves, energy, carrier signals, electromagnetic waves, and signals per se.

To enable user interaction with the computing device 100, an input device 145 represents any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems enable a user to provide multiple types of input to communicate with the computing device 100. The communications interface 140 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 110. The functions these blocks represent may be provided through the use of either shared or dedicated hardware, including, but not limited to, hardware capable of executing software and hardware, such as a processor 110, that is purpose-built to operate as an equivalent to software executing on a general purpose processor. For example the functions of one or more processors presented in FIG. 1 can be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 120 for storing software performing the operations described below, and random access memory (RAM) 125 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 110 to perform particular functions according to the programming of the module. For example, FIG. 1 illustrates three modules Mod1 132, Mod2 134 and Mod3 136 which are modules configured to control the processor 110. These modules may be stored on the storage device 130 and loaded into RAM 125 or memory 115 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 110 can include all types of processors disclosed herein, including a virtual processor. However, when referring to a virtual processor, the processor 110 includes the software components associated with executing the virtual processor in a virtualization layer and underlying hardware necessary to execute the virtualization layer. The system 100 can include a physical or virtual processor 110 that receive instructions stored in a computer-readable storage device, which cause the processor 110 to perform certain operations. When referring to a virtual processor 110, the system also includes the underlying physical hardware executing the virtual processor 110.

The disclosure now turns to a description of example multi-asset management mechanisms, architectures, and related concepts in accordance with various aspects of the disclosed technologies.

Figure 2:
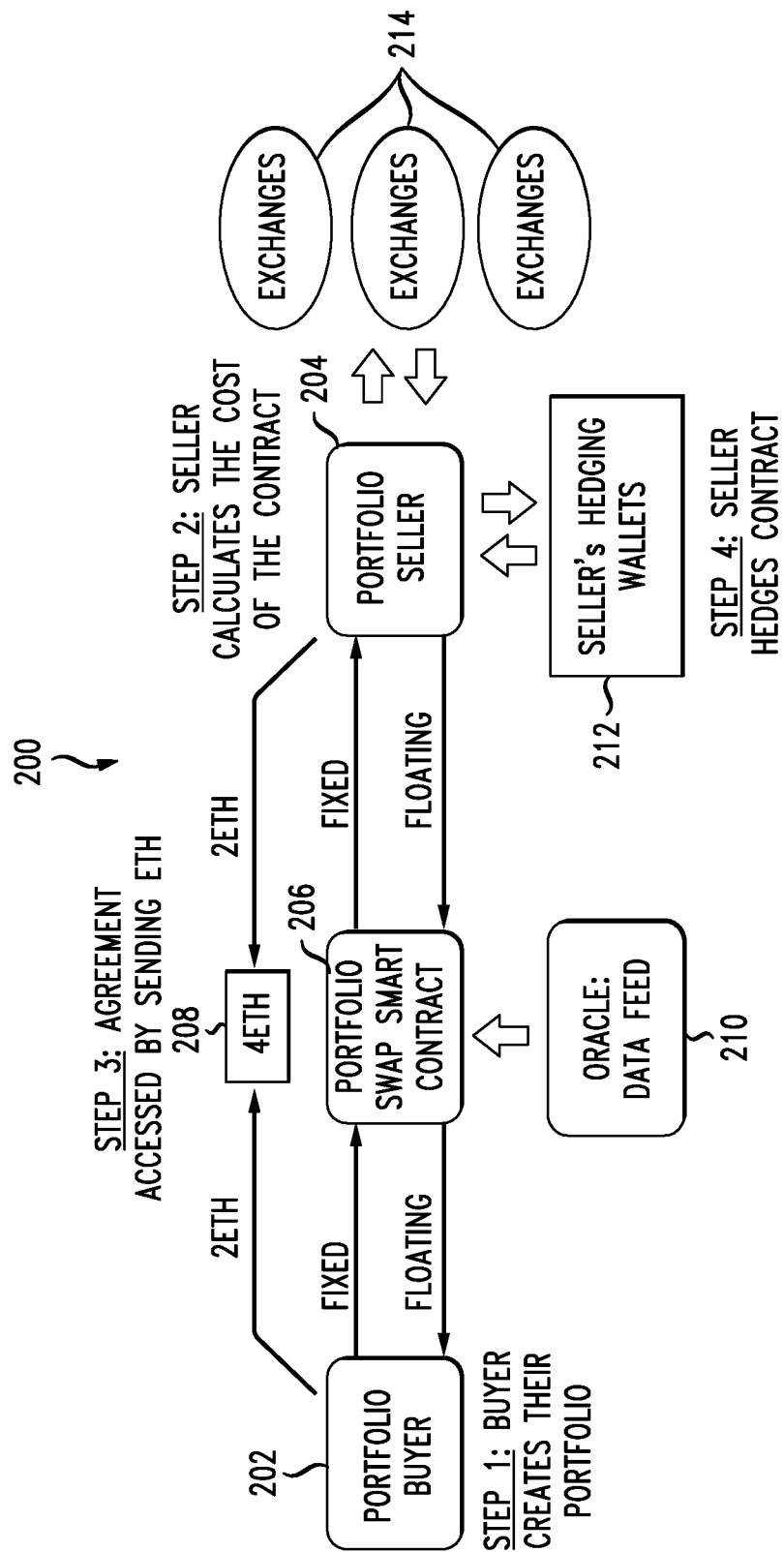
FIG. 2 illustrates an example process for portfolio swaps based on smart contracts and blockchain technologies.

FIG. 2 illustrates an example application and service for managing the buying and selling of asset groups. In this example, the application uses financial swaps implemented as a smart contract. In some examples, the smart contract can be written in one or more computing languages, such as Solidity, the Turing-complete language of Ethereum. Solidity is a high-level language designed to compile code for the Ethereum Virtual Machine.

The application can run smart contracts, which can include autonomous applications or code that run as programmed without downtime, censorship, fraud or third-party interference. The application can run on a blockchain architecture which provides a powerful, shared global infrastructure that can move values around and represent ownership of property. This infrastructure is designed to manage records, transactions, and values in a distributed fashion according to instructions, all without a middle man or counterparty and custodial risk. For clarity and explanation purposes, the example application will be described herein with reference to a smart contract on a platform like Ethereum.

Financial swaps like index swaps and swaptions are financial engineering tools for both trading and risk management. Billions of dollars of these types of swaps are traded daily through the traditional banking system. However, the present disclosure creates an entirely new process for creating, securing, and delivering these swaps to both consumers and institutional buyers. The following discussion outlines various aspects of the disclosed solution.

The disclosed approaches provide novel technologies for multi-asset portfolio management. In some aspects, the disclosed approaches can use blockchain technology to create, enforce, and secure financial swaps without counter-party risk, and crypto-currency or blockchain assets to collateralize such financial swaps. The disclosed technologies can also provide a new type of swap, which can be referred to as "a custom portfolio swap", that differs significantly from an index swap in various ways.

For example, an index swap has fixed components which are usually based on a large public index calculated and created by a third party, e.g. the Dow Jones Industrial Index or the S&P 500 index. The buyer of an index swap receives that index and cannot customize it. These indexes represent an "investment strategy." By contrast, the "custom portfolio swap" disclosed herein, which a user can create using the disclosed application, is not limited to an index with fixed components, and can be customized by the user. Thus, the "custom portfolio swap" can represent the user's own investment strategies, unique from any single index swap on the market today.

Index swaps are further limited to certain assets based on the indexes available. However, many assets do not have an index. For example, crypto-currencies and real world assets do not have an index or exchange traded funds (ETF) available. Moreover, index swaps (as well as all swaps) rely on data from trusted third-parties. On the other hand, the data used in a "custom portfolio swap" comes from trustless oracles, which differ from trusted third-parties.

Other differences between the disclosed swaps and other swaps include that the disclosed swaps will always be "over-collateralized", as opposed to other swaps which typically require fractional margin to enter a swap (vastly under-collateralized). As a result, the disclosed swaps have no counterparty risk and are immune to insolvency for either party. Further, almost all swaps in their current form are designed to be traded on an institutional level, as opposed to a direct-to-consumer product. By contrast, the disclosed technology provides swaps designed as a consumer product, and include significant differences in architecture in order to support this consumer level design.

Swaps are a form of financial derivative. The interest rate swap business has 300+ trillion dollars in outstanding notional value. In the current financial system, swaps provide limited security through: (1) a legally binding contract between the parties to the swap, (2) collateral, margin, and other requirements imposed by clearing houses and brokers around the globe, and (3) the perceived creditworthiness of the two parties to the swap (this is the source of counterparty risk). The new swap disclosed herein can be "secured" and "enforced" through smart contracts written in a blockchain-operable language.

In the context of blockchains and cryptocurrencies, smart contracts are: (1) pre-written logic (computer code), (2) stored and replicated on a distributed storage platform (e.g. a blockchain), (3) executed/run by a network of computers (usually the same ones running the blockchain), and (4) can result in ledger updates (cryptocurrency payments, etc.). In other words, smart contracts are programs that execute if-then logic that run on, and are verified by, many computers to ensure trustworthiness. If blockchains provide distributed trustworthy storage, then smart contracts provide distributed trustworthy calculations. Below are three examples illustrating use of smart contracts in the disclosed technologies. The first example illustrates use or replacement of bank accounts with embedded instructions, the second example illustrates replacement of legalese with computer code and the third example provides an actual smart contract example.

Replacement of Bank Accounts with Embedded Instructions

Bank accounts typically have specific instructions and parameters that define the account's behavior and preferences. For example, bank accounts maintain a balance which indicates the funds available for that bank account. The bank accounts can have instructions defining basic payment and balance management operations for the account. Suppose a user configures the user's bank account to deduct automatic payments to a particular entity (e.g., landlady, utility companies, etc.) for a fixed amount every month, and send the deducted payments to the particular entity. If the balance of the account falls below the amount of an automatic payment configured, the account would not have sufficient funds to cover the amount for the automatic payment. In this scenario, the automatic payment will typically fail, causing the user to possibly receive a fine for insufficient funds and another workflow to be triggered. There are instructions that the user can have set up for the user's bank account, which can define basic conditions or operations for the bank account.

However, in the context of bank accounts, this process is managed by the bank or institution associated with the bank account. By contrast, a smart contract runs on a blockchain and is therefore managed by many parties rather than a single entity. The distributed control and management of smart contracts provides many advantages as previously explained, such as, without limitation security, reliability, and transparency. Moreover, as further explained herein, smart contracts provide more granular control and a significantly greater degree of flexibility and functionality.

Replacing Legalese with Computer Code

A smart contract provides code which automates the "if this happens then do that" part of contracts. Computer code behaves in expected ways and does not have the linguistic nuances of human languages. Computer code has less potential points of contention or ambiguity. In the case of smart contracts, the computer code is replicated on many computers and distributed/decentralized on a blockchain. The computer code is executed by the various computers, which together agree on the results of the computer code execution. In some cases, a user can have a paper contract with all the "whereas" clauses that lawyers employ, and a clause that points to a smart contract on a blockchain. The smart contract can provide, for example, "both parties to the smart contract agree to run computer code x and will abide by the results of the computer code."

Example Smart Contract

Below is an example smart contract illustrating example computer code written for use on the Ethereum blockchain:

```
contract tokenRecipient { function receiveApproval(address _from, uint256 _value, address _token, bytes _extraData); }
contract MyToken {
    /* Public variables of the token */
    string public standard = "Token 0.1";
    string public name;
    string public symbol;
    uint8 public decimals;
    uint256 public totalSupply;
    /* This creates an array with all balances */
    mapping (address => uint256) public balanceOf;
    mapping (address => mapping (address => uint256)) public allowance;
    /* This generates a public event on the blockchain that will notify clients */
    event Transfer(address indexed from, address indexed to, uint256 value);
    /* Initializes contract with initial supply tokens to the creator of the contract */
    function MyToken(
        uint256 initialSupply,
        string tokenName,
        uint8 decimalUnits,
        string tokenSymbol
        ) {
        balanceOf[msg.sender] = initialSupply;         // Give the creator all initial tokens
        totalSupply = initialSupply;                    // Update total supply
        name = tokenName;                               // Set the name for display purposes
        symbol = tokenSymbol;                           // Set the symbol for display purposes
        decimals = decimalUnits;                        // Amount of decimals for display purposes
        msg.sender.send(msg.value);                     // Send back any ether sent accidentally
    }
    /* Send coins */
    function transfer(address _to, uint256 _value) {
        if (balanceOf[msg.sender] < _value) throw;     // Check if the sender has enough
        if (balanceOf[_to] + _value < balanceOf[_to]) throw; // Check for overflows
        balanceOf[msg.sender] -= _value;                // Subtract from the sender
        balanceOf[_to] += _value;                       // Add the same to the recipient
```

```
    Transfer(msg.sender, _to, _value);        // Notify anyone listening that this transfer
took place
  }
  /* Allow another contract to spend some tokens in your behalf */
  function approve(address _spender, uint256 _value)
    returns (bool success) {
    allowance[msg.sender][_spender] = _value;
    return true;
  }
  /* Approve and then comunicate the approved contract in a single tx */
  function approveAndCall(address _spender, uint256 _value, bytes _extraData)
    returns (bool success) {
    tokenRecipient spender = tokenRecipient(_spender);
    if (approve(_spender, _value)) {
      spender.receiveApproval(msg.sender, _value, this, _extraData);
      return true;
    }
  }
  /* A contract attempts to get the coins */
  function transferFrom(address _from, address _to, uint256 _value) returns (bool success) {
    if (balanceOf[_from] < _value) throw;        // Check if the sender has enough
    if (balanceOf[_to] + _value < balanceOf[_to]) throw; // Check for overflows
    if (_value > allowance[_from][msg.sender]) throw;   // Check allowance
    balanceOf[_from] -= _value;                  // Subtract from the sender
    balanceOf[_to] += _value;                    // Add the same to the recipient
    allowance[_from][msg.sender] -= _value;
    Transfer(_from, _to, _value);
    return true;
  }
  /* This unnamed function is called whenever someone tries to send ether to it */
  function ( ) {
    throw;     // Prevents accidental sending of ether
  }
}
```

The example contract generates 10 thousand tokens to the creator of the contract, and then allows anyone with enough balance to send it to others. These tokens are the minimum tradeable unit and cannot be subdivided, but for the final users could be presented as a 100 units subdividable by 100 subunits, so owning a single token would represent having 0.01% of the total.

The above example contract provides unique control and flexibilities that automated banking payments lack. For example, a user's bank is the ultimate guardian of the user's bank account. The bank has complete control, and can arbitrarily add money to the account or subtract it. In a blockchain ecosystem, there is no single source or entity of control. The distributed layout with consensus mechanisms in blockchain allows multiple parties to check and re-check and update the ledgers. Anything in the blockchain that does not conform to pre-agreed rules, can be rejected by any of the participants.

The above example contract also provides code control and validation as opposed to automated banking accounts. With a bank account, there is some logic creating transactions on a monthly basis. That code resides on the bank's system and is executed by the bank. The bank has full possession and control. In the banking context, there are no external validations. With smart contracts running on a blockchain, the logic runs on all participating computers, and the results are compared by all participants. Participants only change their own version of the ledger if they agree with the results. Thus, each participant has code control and validation capabilities.

In addition, the above example contract provides a level of transparency that is not available in the banking context. For example, for all participants in a blockchain ecosystem to run the same code, each participant verifying the other(s), the logic of the smart contract is available and visible to all participants. This allows any participant to review a smart contract, and decide whether to use the logic after first reviewing the logic. If a participant does not like or approve of the logic, that participant has the option to reject the logic (i.e., not to use it). There can be smart contracts for general usage, as well as specific smart contracts. The transparency is useful to stakeholders of the contract to agree on what happens.

The above example contract provides significant flexibility to make adjustments and customizations that are not otherwise available in banking systems. For example, the logic that a user can run within their bank account is limited to recurring payments, and possibly a few other basic options. A user cannot, for example, automate a payment from their salary account to their savings account every day it is sunny, then have it all sent back when there is a storm (the "saving up for a rainy day" smart contract). By contrast, a "Turing complete" smart contract can do anything that a normal computer can do, including numerous operations and customizations.

Smart contracts can be very useful when there are multiple parties who may not trust each other fully, as each party can compare their version of events with the others. For example, when two banks do a complex derivative trade with each other that does not go through a clearing house, it is called an "Over The Counter" or OTC trade. These are agreements between the two banks, without third-party validation. These trades are usually bets—i.e. variations of "if this happens before the end of the year then you pay me, else I pay you". Both parties have a copy of the original trade documents (the terms and conditions of the trade), and they both have a view on the external dependencies of the trade. The parties should both therefore agree on the outcome of the trade, i.e. who wins the bet.

However, parties may not always agree on the outcome of the trade. A mismatch or "break" can occur in the dependencies, where parties do not agree on the outcome of the trade, due to a number of things. For example, problems can include: (1) A mutual misunderstanding of the initial trade terms; (2) Confusion due to multiple copies of the original trade terms (usually there is back-and-forth on the wording of the documents, with in-house lawyers on both sides trying to protect their interests); or (3) A disagreement with what actually happened in the external dependencies.

With a smart contract, there is only one set of trade terms, written in computer code, which is more precise than a contract written in legal terms, and agreed upon up-front. The external dependencies (e.g., price of oil, share price, etc.) can be input via a mutually agreed feed. The contract will live on a blockchain, and run when a condition occurs (e.g., when an event happens or the bet expires). The bet payout can be stored in the smart contract itself: the contract is "primed" by both parties funding the account with their maximum loss, and the payout is made when the condition occurs (e.g., at the event). Also, a lot of trades in financial services are currently done on credit and margined or collateralized; the necessity to pre-fund the total payout with the full value of the potential payout, in the currency/asset of the payout may not be attractive.

A further description of smart contract offerings in accordance with various aspects of the disclosed technologies is provided in the following discussion.

Blockchains (e.g., Bitcoin, Ethereum, etc.) have varying degrees of effectiveness in running smart contracts. Bitcoin's platform is great for processing bitcoin transactions, but otherwise limited in compute ability. Within the scripts of bitcoin transactions, there is a very limited ability to implement rich logic. An example of what is possible in bitcoin is logic requiring multiple signatories to sign a transaction before a payment is made, like needing two signatories in a check. However, major changes would be necessary to both the mining functions and the mining incentive schemes to enable smart contracts properly on Bitcoin's blockchain.

Sidechains, i.e. blockchains connected to Bitcoin's main blockchain, can enable smart contract functionality by having different blockchains running in parallel to Bitcoin. These sidechains can be programmed with an ability to jump value between Bitcoin's main chain and the side chains, such that side chains could be used to execute logic.

NXT is a public blockchain platform which includes a selection of smart contracts that are currently live. However it is not Turing-complete, meaning that a user cannot customize it as desired. Instead, the user must use the existing templates. Ethereum, introduced above, is a public blockchain platform which is currently the most advanced smart contract enabled blockchain. With a "Turing complete" coding system, theoretically a user can put any logic into an Ethereum smart contract, and it will be run by the whole network. There are mechanisms in place to prevent abuse, and users need to pay for compute power by passing in "ETH" tokens, which act as payment for the miners who run the code.

There are some questions and challenges to the structure described above. For example, decentralization is expensive. The more computers that run code, the more expensive things get for the end users. A system that has 10,000 computers running the user's code can incur significant costs: the computer operators are likely not going to provide their computer infrastructure and run the code on their computer infrastructure free of charge. In a public network, the users pay to run all the machines on the network. Having every computer ("node") in a system store data (e.g. a copy of the blockchain, or a portion of the blockchain corresponding to specific assets/portfolios) and run the smart contract code embedded within the blockchain is more expensive than having one or two participants run the code on individual computers. Currently, nodes have to compute everything even if they are not attempting to mine the block, because the only way to validate a block is to run the code and compare the answers to the mined block.

It is typically sufficient to have the code written on a blockchain so the parties can see the smart contract they are committing to. In this case, the code can be run privately, perhaps by the very parties to the transaction. This would save on compute costs, but increase risk because only the transaction parties would be verifying the transaction/contract action (whereas normal blockchain interactions are verified by anonymous servers).

Another factor in contracts is optionality. In many contracts, clauses are written into things to create a channel for arbitration. For example, in a flat rental agreement, wear-and-tear from tenants is acceptable, but major damage needs to be repaired. How does code define these things? Force majeure is present in many contracts to allow for wiggle-room for the parties involved. In a smart contract environment, how does one party call that without abusing it or referring to a human arbitrator? These issues can be addressed through smart contracts. Ultimately, shared ledgers will have a role to play in removing the need for trust among multi-party agreements. Smart contracts make sense for all parties by reducing operational risk, and can provide automated trustworthy workflow between parties without a central specific coordinator. However, in the disclosed application, there is no need for any type of subjective arbitration since crypto-currencies pricing and trading data is highly public, replicated, and simple to understand. Any two observers can easily agree on the pricing data coming from the API of a public crypto-asset exchange.

The following description provides details of an application from a user's perspective. FIG. 2 illustrates the overall process 200 for an example application in accordance with various aspects of the disclosure. By way of example, FIG. 2 shows a series of steps implemented by Prism (a name given to the disclosed platform) to create a trustless asset group which can be a portfolio of assets. Every trusted asset group created is a swap of one or more assets. In Prism, there are at least two parties to the trade and a smart contract 206. The parties are the Portfolio Buyer 202 and the Portfolio Seller 204. For clarity, throughout the rest of this document, the Portfolio Buyer may be referred to as the buyer, the Buyer, or the user collectively; and the Portfolio Seller may be referred to as the seller, the Seller, or a business entity.

Solidity, the Ethereum Virtual Machine and the Ethereum blockchain collectively work to enforce the smart contract that allows a single trustless portfolio to exist and execute. Swaps are a promise or agreement for each party (the buyer and the seller) to swap asset exposures for some amount of time. With swaps, the underlying assets are not exchanged. All that is exchanged is a contract that binds each party to pay one another based on the change in value of the underlying assets as recorded by some agreed upon external data, like a benchmark, price feed, or in this case, the oracle 210.

The multi-validator oracle 210 is an ensemble of blockchain-based smart-contracts and a set of applications (e.g., JavaScript based applications) that enable the validation and authentication of data sourced from the public APIs of any website in the world. This data is pushed to a blockchain-based smart-contract called the oracle (or any other name with similar functionality) 210. The oracle 210 is used to provide information to decentralized applications. More specifically, the oracle 210 can provide a data feed to the smart contract 206.

The trade can be explained in the context of a contract for difference (or CFD) example. Assume Alice wants to bet on the change in next quarter's US GDP. She creates the buyer portfolio 202 and the terms of the smart contract 206. For example, she creates a contract that includes a formula such as PAYOUT=(ALICE_PREDICTION—(GDP1Q2014/GDP4Q2013−1)*GEARING) and funds it with 10,000 ETH. The script in the contract specifies that anyone who sends 10,000 ETH to this contract 206 will take the other side of this trade. Say Bob creates a seller portfolio 204 and accepts the offer. The script also contains the public key of an "oracle" 210, e.g. a trusted website that publishes economic statistics for the purpose of authoritatively fixing the settlement value of CFD's. After X days, the script in the contract 206 consults the oracle 210, pays a small fee to the oracle 210, and gets a signed value for GDP1Q2014, which the script checks against the oracle's public key. The script then computes the formula and sends Alice max(10000+PAYOUT,0) ETH and Bob max(10000−PAYOUT,0) ETH.

The smart contract 206 swap mechanism configured on a blockchain enables two parties, a "buyer" and a "seller," to establish opposite positions in a trustless swap arrangement for exposure to a set of arbitrary assets. One of the problems addressed by the smart contract structure is that financial swap arrangements require trusting one or more parties to deliver or satisfy obligations upon settlement (performance). Every swap thus has counter-party risk, and this risk must be priced and paid ultimately by one or more parties in the arrangement.

The smart contract herein provides a technical solution to this issue. The following is a brief summary of the process with reference to FIG. 2. The blockchain-based smart contract 205 is a trustless multi-asset swap mechanism (TMASM) paired with a data-feed oracle 210, in which performance and settlement of a swap arrangement occurs automatically and without risk to either party. The swap is established by the buyer 202, who selects one or several assets to which the buyer seeks exposure. The swap is accepted by the seller 204, who agrees to hold the other side of the same position. Stated in another way, the buyer 202 offers a contract to the seller 204, in which buyer 202 promises to pay the seller 204 the "fixed leg" of the swap, in return for the seller 204 paying the value of the portfolio (the "floating leg") when, and only when, the contract is closed by the buyer 202. The buyer is making a promise to the seller to pay them a certain amount which is the portfolio's value at the time of the purchase. The time of the payment will be in the future. Say, at the time of the purchase, the portfolio value is 100 ETH. The fixed amount is therefore 100 ETH that the buyer promises to pay the seller upon closing out the contract in the future. Upon acceptance by both parties, both the buyer 202 and seller 204 submit a blockchain transaction into the smart-contract 206, which includes the sum of a principle amount (derived from a value of the selected assets) and a collateral amount (derived from the preferences of the buyer and/or seller).

Upon receipt of both transactions, the swap contract 206 is activated, existing on the blockchain (for example, Ethereum's blockchain). The smart contract 206 utilizes a data-feed (oracle 210) to periodically calculate the value of each party's position. The buyer 202 may close the swap contract at any time, at which point the smart contract will transact proportionate assets to the buyer 202 and the seller 204 (divided from among the principle and collateral deposited by both parties), based on the rise or fall of the underlying portfolio.

The portfolio buyer 202 has been able to enter that entire portfolio of assets without actually having to go out and purchase them and take physical custody of the assets. The process reduces the exposure of risk to the buyer, and increases the convenience and speed of obtaining exposure to those assets. On the back end, the portfolio seller 204, which can be an individual or a business entity, will act like a clearinghouse, but without taking custodial ownership of the assets. The portfolio seller can design and implement the smart contracts which anybody can see. The seller can take a fee for creating and managing the smart contract and participating in the selling process.

As noted in the example above, the portfolio buyer 202 contributed 100 ETH into the smart contract 206. That was the original amount of the portfolio buyer 202. The seller 204 also contributed 100 ETH. This is the collateral. When the portfolio is settled, in favor of the portfolio buyer at a value of 150 ETH, the profit of 50 ETH comes out of the collateral that the seller had to contribute originally. So, of the 200 ETH in the contract 206, including 100 ETH from the portfolio buyer 202 and 100 ETH from the seller 204, when the contract 206 was settled, 150 ETH went into the portfolio buyer 202 and 50 ETH went to the seller 204, automatically and without human interference.

The process is "trustless" because it is executed automatically by smart-contract code on a blockchain. There is no entity or group of individuals that can alter the terms of the contract or manipulate its settlement. The smart contract always meets its obligations. The disclosed concepts herein bring the marketplace directly to the consumer in an entirely unique and novel way.

Normally, with a mortgage or a credit card, there are a number of different entities involved, including a bank. There are different processors, counterparties, etc. that can be holding the money at some point. By contrast, the approaches disclosed herein transform the financial system into a blockchain smart contract that is packaged in a consumer product that delivers to the consumer what the consumer wants—which is the ability to own a portfolio of assets and have the assets managed. In one aspect, a user can develop such a portfolio (for example, a portfolio of several blockchain assets or cryptocurrencies) without having to download an individual wallet for each blockchain asset currency to buy that currency and without having to leave the asset on deposit with a counterparty. Consequently, the user can develop a portfolio of assets without requiring multiple private keys, multiple applications, and multiple counterparties. Moreover, the user is not required to send money to each specific exchange to buy blockchain assets in that specific type of currency.

Thus, the concepts disclosed herein allow a user to create a multi-asset portfolio (e.g., a portfolio of multiple blockchain assets and/or any other type of asset). For example, the concepts disclosed herein can aggregate the process so the user can, in simple, fast, and efficient way obtain a portfolio of blockchain assets without downloading an individual wallet for each type of asset or leaving assets on deposit with a counterparty. In some examples, the management component can be accomplished through a leader-follower functionality, as further described herein. The end users can access such a service through a user interface, an application, a website, an API, or any other means.

Figure 3:
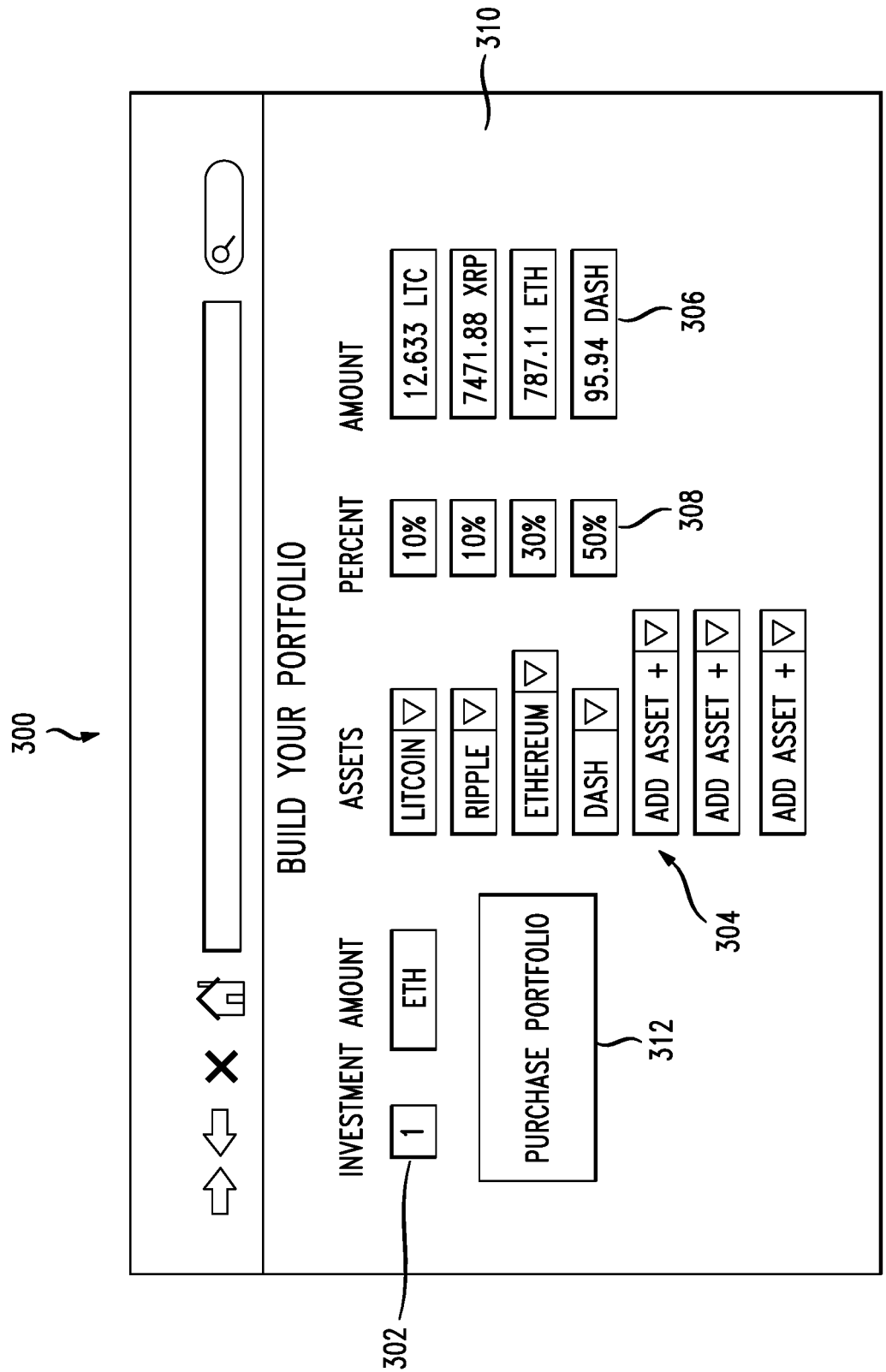
FIG. 3 illustrates an example graphical interface for building a portfolio of assets.

FIG. 2 in connection with other figures, referenced throughout the disclosure, further demonstrates an example process. In the figure, reference to ETH is representative of any value/type of currency (including Bitcoin) depending on the platform desired. As noted above, in the first step, the user (buyer) creates the buyer portfolio 202 of blockchain assets. The user can create the buyer portfolio 202 via an interface, such as web interface 300 shown in FIG. 3.

The web interface 300 can include a portfolio settings area 310 that allows a user to enter various parameters for building the buyer portfolio 202. The user can enter various parameters in the portfolio settings area 310 of the web interface 300 to create a portfolio. For example, the user can select blockchain asset components and respective asset percentages, such as A % Litecoin, B % Ripple, and C % DASH, from an assets area 304 and a percentages area 308. The user can provide an investment amount 302, such as 1 ETH, for the portfolio. The system can then calculate respective assets amounts based on the prevailing rates from the exchanges 214 coming from the blockchain asset data feed (the oracle) 210 at that point in time, such as X number of Litecoins, Y number of ripples, and Z number of dash, and provide the respective asset amounts in an asset amounts area 306. The user can then select a control element 312 to create or purchase the portfolio. For example, the user can click on the control element 312 to build the portfolio. In some cases, the control element 312 can include one or more labels, such as "create portfolio" or "purchase portfolio".

The system can summarize the portfolio with an asset value, a collateral value, a creation fee and a monthly fee as well. Any combination of this data can be presented. The user can then enter their ETH address to continue, which should be the same address used to send funds to the multi-asset portfolio. If the currency used for payment is ETH, the user could send the number of ETH to the ETH address. A QR code could also be used to summarize the transaction. A bar can be included in the graphical interface to instruct the user of their progress in how many ETH have been sent and how many are owed to complete the payment. Once payment is complete, a summary page can show the amount paid, an email address for a receipt, and a link to enable the user to view the portfolio they just created and purchased. In some example interfaces, the system can present a listing of portfolios created by a particular owner (ETH address). Data can include a starting value in ETH (or other currency) and dollars, a current value, a listing of the portfolios by name, date created, rank, a graphic like a pie chart for example, a Prism ID, a starting value, a current value, a rate of return, and/or a total value.

A further graphic can be presented which includes a left-to-right graphic of value in dollars or ETH that shows an initial value in one color and another increase in value in another color. In some examples, the interface can enable the owner of the portfolio to rebalance, sell or make the asset group public.

FIG. 4 illustrates an example interface 400 providing a purchase summary for the user and information for finalizing the purchase. The interface 400 includes a purchase summary 402 indicating various details of the purchase, such as a respective portfolio value, a respective asset, a respective asset percentage, and a respective asset amount. The interface 400 can also include a timer 404, which can indicate an amount of time left to pay. The interface 400 can also include a payment amount and location 406 identifying a payment amount and location (e.g., how much to send for payment and where to send the payment), in order to complete the purchase. Based on the interface 400, the user can determine the amount of payment necessary and address for sending the payment, which can be provided via the payment amount and location 406, as well as the amount of time left for transmitting the payment, as indicated in the timer 404.

The interface 400 can also provide additional information for the user. For example, the interface 400 can include a notes and warnings area 408 which can present any notes, details, or warnings for the user which pertain to the purchase. In some cases, the interface 400 can also include a reference to other payments to complete the contract, such as 1 ETH for collateral or other fees or charges.

Once the portfolio is paid for and in an "active/open" state, the buyer can choose to close the contract at any time, but the seller cannot. The terms "close", "settle", "liquidate", or "exit" each generally mean that the buyer has elected to close the contract and retrieve their funds from the contract. In one example, the buyers may commit to close within a specific period of time such that the seller is not held to the contract indefinitely. Notices can be provided to the buyer if they do not act within a predetermined period of time such as 6 months. In cases where a buyer passes away, procedures would be put in place to handle an estate or other entity closing the contract.

Referring back to FIG. 2, in step 2, the seller calculates and quotes a portfolio price to buyer. The seller calculates the cost of the asset group based on the buyer's offer and sends that information back to the buyer. Additional details of this calculation will be discussed below. For now, just think of it as the "service fee" charged by the seller and can be calculated for each portfolio which any user wants to purchase.

In step 3, the buyer accepts seller's quote and enters the contract. In this example, the buyer accepts the terms of the swap contract by sending 2 ETH (or other value or currency) to the smart contract 206. One ETH pays for the investment in the portfolio, while the other ETH is the excess collateral required for the trade. These numbers are purely exemplary—however, some transactions can require one or more of two portions: (1) the trade itself+(2) the cost of performing the trade. The buyer "signs" the contract using the private keys of the address from which the 2 ETH were sent.

Figure 5:
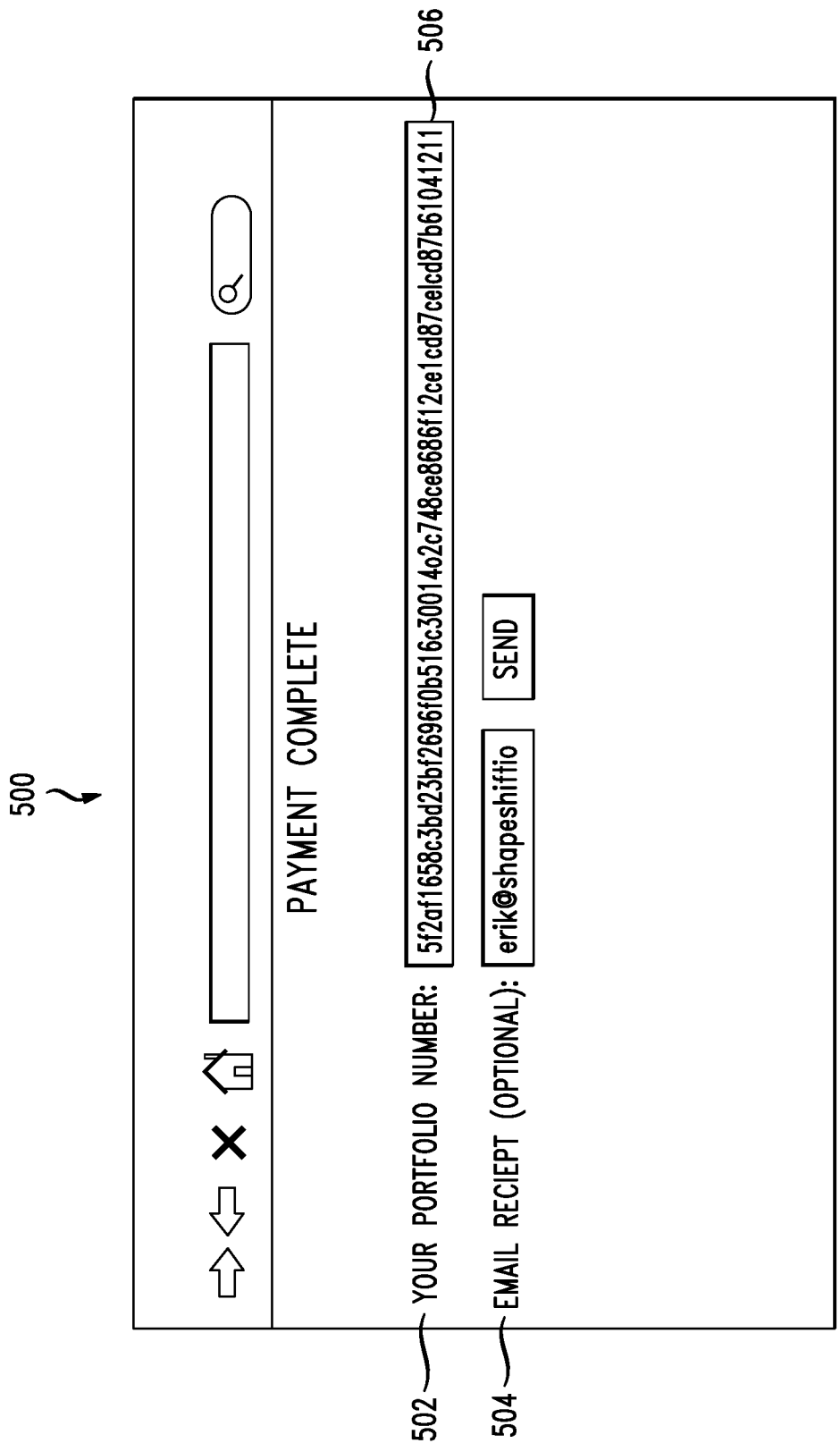
FIG. 5 illustrates an example graphical interface for completing payment for a portfolio of assets.

Referring to FIG. 5, an interface 500 can be presented to provide payment details and receipt information. The interface 500 can provide a portfolio number label 502 with the number 506 for the portfolio, as well as an email receipt input field 504 to allow the user to enter an email address for receiving a receipt of the purchase.

Turning back to FIG. 2, the seller is notified that the contract has been "accepted" by buyer 202. The seller 204 also "accepts" the contract by sending the seller's corresponding amount to the smart contract 206. In this example, the seller 204 accepts the contract by sending two ETH to the smart contract 206. Again, the private keys of the sending address are seller's signature keys for the contract. The address for an Ethereum contract can be deterministically computed from the address of its creator (sender) and how many transactions the creator has sent (nonce). The sender and nonce are RLP (recursive length prefix) encoded and then hashed with, e.g., Keccak-256. Below is an example pyethereum code:

def mk_contract_address(sender, nonce):
    return        sha3(rlp.encode([normalize_address(sender), nonce]))[12:].

Below is a specific example with some discussion:

For sender 0x6ac7ea33f8831ea9dcc53393aaa88b25a785dbf0, the contract addresses that it will create are the following:

nonce0="0xcd234a471b72ba2f1ccf0a70fcaba648a5eecd8d"

nonce1="0x343c43a37d37dff08ae8c4a11544c718abb4fcf8"

nonce2="0xf778b86fa74e846c4f0a1fbd1335fe81c00a0c91"

nonce3="0xfffd933a0bc612844eaf0c6fe3e5b8e9b6c1d19c"

The smart contract 206 is at this stage holding 4 ETH, indicated by the amount 208 in FIG. 2. The smart contract 206 will continue to hold the amount 208 until the buyer chooses to close the contract, at which time the contract will be settled.

In optional step 4, the seller 204 can hedge the contract 212. This is an optional choice as part of the process and is not required to manage the portfolio. The seller can "hedge" its position in the contract by purchasing the underlying assets or currency that make up the seller's portfolio from an array of blockchain asset exchanges 214, and then holding the purchased assets or currency in the seller's own wallet(s). In this case, the seller 204 would purchase X Litecoins, Y ripples, and Z dash, and hold them until the contract is closed by buyer 202, at which time they will sell them on the market. As a result, seller's exposure to this contract is perfectly hedged (or nearly perfectly hedged) at all times in the future.

FIG. 6 illustrates an interface 600 providing a summary of the portfolio. The interface 600 includes a current value 602 and data such as the percentage of gain or loss. Feature 604 provides options for the buyer to sell, rebalance, share, or add to leaderboards. At some point, the buyer can decide to close the trade or rebalance the portfolio using the interface 600. Assume this is time (T)=7 days. For simplicity, it will be assumed that the buyer wants to "close" the contract and not "rebalance" the contract.

The following is an example of the contract settlement and closure process. In a first step, the buyer initiates contract closure through an interaction with the user interface 600. This action can be initiated by a signed message from buyer's Ethereum private key (the same one used to enter the contract), which the smart contract 206 recognizes as the only signal that can initiate settlement of the trade. The smart contract then settles the contract. For example, to settle the contract, the smart contract can first calculate the current value of the portfolio based on blockchain asset pricing data from the oracle 210. In this example, at T=7, assume the value of the Buyer's portfolio is 1.5 ETH. That means the value of the portfolio went up 50% from its initial value of 1 ETH. The smart contract 206 then calculates the amount of collateral and resulting proceeds to be sent to the buyer 202, while subtracting the seller's commission for the trade (which in this example will be 0.1 ETH).

Below is an example of the settlement calculation:

At T=7 the buyer will receive 2.40 ETH, while the seller will receive 1.6 ETHs. This is because buyer" value is 2.40 ETH which equals 1 ETH (original investment amount)+0.5 ETH (profit from trade)+1 ETH (original excess collateral amount)−0.1 ETH (the seller's commission). The seller's value is 1.6 ETH which is derived from 0.5 ETH (difference from original investment and loss on the trade)+1 ETH (original excess collateral amount)+0.1 (the seller's commission).

Once the calculation is finished, the smart contract 206 automatically sends the ETH to the address provided by each party at the beginning of the trade. The contract has now been closed and settled.

In the next step, the seller 204 lifts the contract hedge 212 (if it is used) by selling underlying assets (e.g., coins). Based on this contract, in this example, the seller lost 0.5 ETH as the result of its bet on the price movement of buyer's portfolio of blockchain assets. However, the seller in this example previously purchased an exact mirror image of that portfolio of blockchain assets when the trade was initiated. Therefore, when the trade is closed and settled, the seller 204 will sell that exact portfolio of assets on blockchain asset exchanges for which it has earned a profit of 0.5 ETH. Therefore, the seller has not lost any value on the trade, but has gained 0.1 ETH (the commission). This illustrates why the seller was perfectly hedged at the start of the trade.

The buyer, in addition to being able to close out the contract, can also perform a rebalancing. The rebalancing option is presented by way of example in interface 700 shown in FIG. 7. The need for rebalancing arises in the context of a multi-asset portfolio in which the user may desire to change at least one asset's percentage or amount in the portfolio after it is created. When a user wants to change the composition of the user's portfolio, such as adding/removing a coin or changing the weightings/percentages of a coin in their portfolio, the user is able to use the same asset group to do so.

Figure 7:
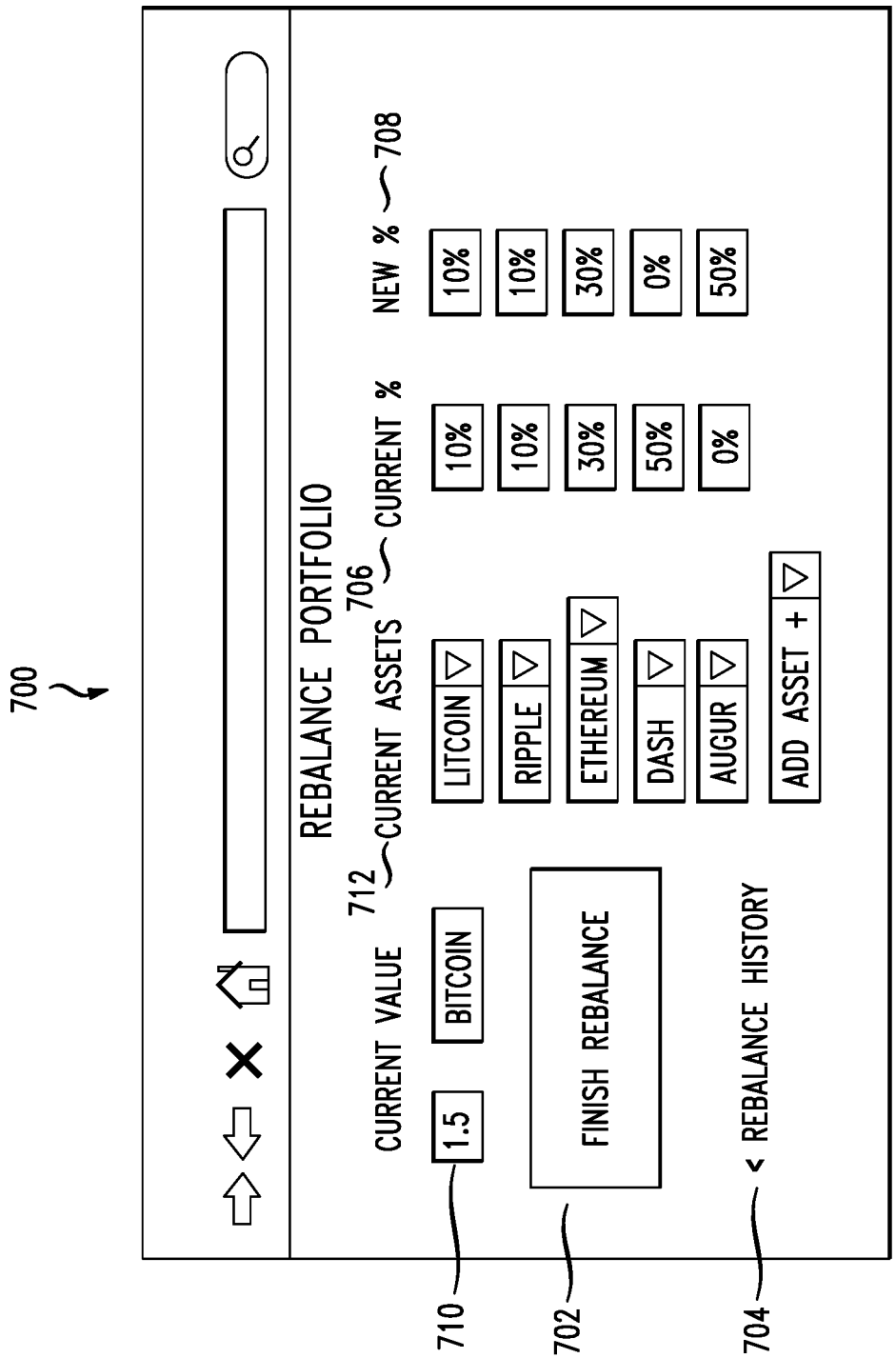
FIG. 7 illustrates an example graphical interface for rebalancing a portfolio of assets.

Interface 700 in FIG. 7 shows a current value 710, the current assets 712, an option to change percentages 706, 708, and an option 702 to complete the rebalancing. An option 704 for accessing a rebalancing history can also be provided. When a rebalance occurs, a similar set of calculations takes place as when the user created the portfolio or wants to settle the portfolio (e.g., a calculation of respective assets amounts based on the prevailing rates from the exchanges coming from the blockchain asset data feed at that point in time, etc.).

A trustless multi-asset swap rebalancer is a set of functions programmed into the blockchain-based smart contract 206 which allows for the rebalancing of a portfolio of assets in accordance with the requirements and demands of the owner of that portfolio. These assets exist via the trustless multi-asset swap mechanism technology and the trustless multi-asset swap rebalancer is a component of that technology.

An example trustless multi-asset swap rebalancer process using interface 700 can be as follows.

The buyer 202 decides which coins it would like to change in the interface 700, and sends the new portfolio composition to the smart contract as a signed message. The smart contract 206 calculates the new portfolio value, collateral, etc. based on oracle data 210 at that point in time. The seller 204 takes a rebalancing fee to process this change and accepts the new portfolio. The seller and buyer do not have to send more collateral if the rebalance is within the collateral limits for the contract. If the user 202 rebalances to a large portfolio, the user would need to add collateral to the contract. This is one of the reasons why in the aforementioned example, the system asks the user to send "excess collateral" to the smart contract at the creation of the contract. This excess collateral can be used for future rebalances as well as other purposes.

Both parties can confirm the rebalance data via a signed message, after which the state of the portfolio is updated. The seller can change its underlying hedging portfolio accordingly to maintain the seller's perfect hedge by buying or selling the mirror image of what the user bought and sold during the rebalancing of the contract.

The contract is written into the blockchain and thus onto the public ledger which may not be manipulated by any single party. When the user decides to rebalance the contract, or the percentage of one or more assets in the portfolio, that results in a state change. The new state change is going to also be written into the blockchain. The new state change cannot be erased or changed by any participant, and every participant can see it.

When a user rebalances the portfolio, the rebalancing can result in various scenarios. For example, if a user rebalances the portfolio to have a higher value than its current portfolio value, then the user would have to add incremental funds to the smart contract. In one example, assume a portfolio that started out as a 100 ETH valued portfolio is rebalanced and in the rebalancing becomes worth 200 ETH. The buyer must put in an additional 100 ETH. The seller also must put in an additional 100 ETH. The amount added at the time of the rebalancing is that value above the current value of the portfolio (not the original value).

The portfolio is fully collateralized. One of the risks in derivatives is that every participant is buying them on margin. If that margin gets exhausted, then problems arise. By contrast, the contracts disclosed herein are fully collateralized, which reduces the entire counterparty risk or trust in the system.

If the seller does not want to add more collateral, then the rebalancing would not be established. If the user wants to change the allocation of cryptocurrency and the value of the portfolio does not change, the rebalancing can occur without additional collateral or approval from the seller. However, there could be mechanisms where if thresholds are met, then the seller would have to approve the rebalancing. For example, if more than 20% change in any asset is made, then the seller can be required to approve. In another scenario, if the seller does not want to add collateral, the buyer could go back to the marketplace and a different seller could buy into the rebalanced portfolio and the portfolio could end up with two sellers, each having a proportional share of the portfolio. However, if the seller is a business entity that is servicing the portfolio sale requests, then those rebalancing requests can always be met (within limits). Thus, such a business entity could create the entire marketplace for such trades. The sellers can be more like hedge funds and larger players or can provide a means for such players to get access to the smart contracts disclosed herein. After the user rebalances the portfolio, the process goes back to normal until the user closes out the contract. The user can rebalance any number of times before closing. At closing, as instructed by the buyer, the smart contract calculates the result and sends the right amount to each party.

Referring to FIG. 8, an interface 800 can enable social trading. The interface 800 allows users to share their "portfolio" with their connections/friends in a social network. As illustrated, users can post messages 802 via interface 800 which include links, addresses, and/or other information for sharing assets and/or portfolios between users in the network.

This aspect can also relate to the leader-follower feature. The leader-follower mechanism can reduce and eliminate the risk associated with any individual giving up custody of one's wealth to another person or corporation who acts as a trusted third party and whose goal is to make investments on behalf of the individual. The system can insert or include certain authorizations into a smart contract. Prior to the present disclosure, if people wanted someone to manage their investments, they can send their money to a financial advisor or entity. Such entities have infrastructure to keep their investments safe. The follower-leader function allows one portfolio buyer, who essentially has a contract, which is their portfolio, to authorize another contract to do a specific thing—to send messages to their portfolio that tell it how to rebalance and tell it the exact percentages and the weightings. The leader contract, however, cannot instruct the follower contract to settle, or sell collateral, etc. It is only allowed to send a single message to the follower of portfolio saying, for example: "I just rebalanced my portfolio and here are my new weightings and assets." And then the follower portfolio automatically rebalances based on the leader adjustments.

The leader portfolio never has to take custody of funds. This approach removes all the custodial risk aspects. In some respects it is like programmed money. It is money that cannot be told to do bad things. In the hedge fund world, there are solvency issues and audits, and there is no way around these issues as of now because of how investments are made: Hedge funds need to take the custodianship of the funds. With the leader/follower approach disclosed herein, the user—(1) Never gives ownership of the funds to the seller, (2) Never has to worry about the settlement calculation, and (3) Can get the information directly from a professional, the leader in this case, but that program in the smart contract only is allowed to give the instructions of rebalancing.

The follower in some cases could be given options to accept the leader's rebalancing, or to further adjust the rebalancing and then apply it to the follower's own portfolio. Market research could be provided at this point to the follower. For example, the 1 year or 1 month percentages of the performance of the assets in the rebalancing could be presented to the follower before accepting the rebalancing. Followers could also program or require certain parameters or triggers that are automatically implemented. These can relate to performance, performance history, boundaries on variation in the rebalancing, thresholds on additional collateral needed, limits on percentages of certain assets in their portfolio, a percentage of how much of the rebalancing to accept (e.g., I will follow 50% of the changes of the leader). The parameters could be a timing issue as well, such as implementing the rebalancing 1 week after the leader rebalances and with the authorization of the follower. In this way, the follower could see the performance of the rebalancing before following.

The use of blockchain and smart contracts herein can provide significant advantages over a robot-type advisor. For example, with a robot advisor, the user must give the user's money to a third party to manage. Use of a third-party custodian of the money can create various risks as previously explained. However, the smart contracts and rebalancing performed on the blockchain herein eliminates the risks of using a third-party custodian of the money.

The use of blockchain and smart contracts herein also provide significant advantages over use of brokers, and reduces risks associated with using brokers. For example, assume a broker has an algorithmic trading system that is a computer program that buys or sells assets. With the broker, the algorithmic trading system, and thus the computer program, is hosted and/or owned by the broker. The computer program instructs the broker's system to make trades on specific market(s) based on funds that the broker has taken custody of. By contrast, in the approaches herein, the blockchain is not hosted on systems owned by the broker, or any single entity. Moreover, the smart contract algorithm is provided by computer code in the blockchain (e.g., the Ethereum blockchain). The blockchain is not owned by any single entity. The blockchain does not take custody of the funds. Accordingly, the custodial aspects are separated from the investment manager. The follower still has to trust the leader's investment decisions, but the follower does not have to trust the leader's custodianship of the money.

Figure 9:
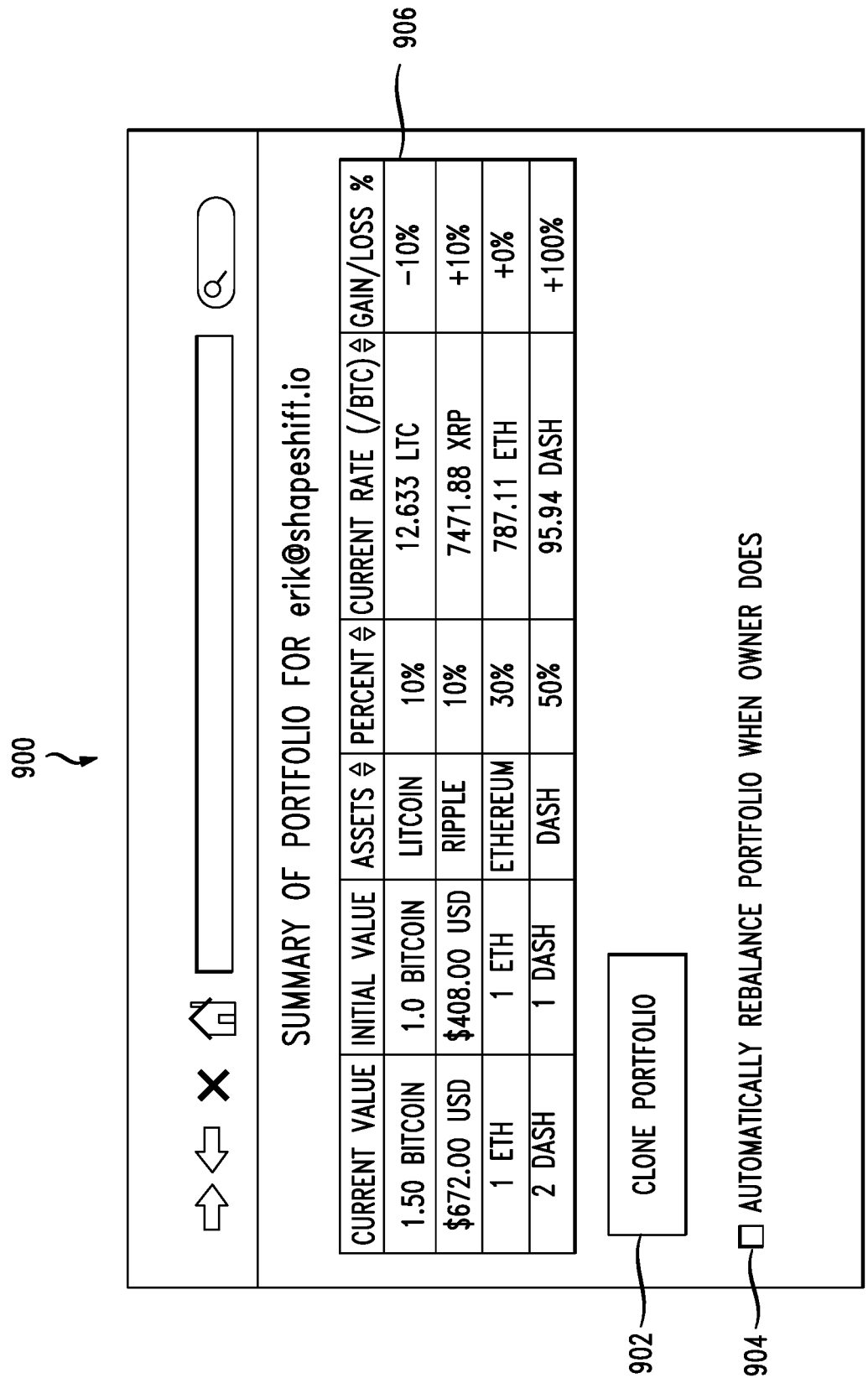
FIG. 9 illustrates an example graphical interface for following a portfolio of assets.

FIG. 9 illustrates an example interface 900 for accessing portfolio information and features. In this example, the interface 900 can provide a summary section 906 with a summary of the portfolio for the user. The interface 900 can include a clone option 902 to allow cloning of the portfolio. For example, the clone option 902 can trigger a cloning operation, which can provide an opportunity for a user, such as a friend or acquaintance, to clone the portfolio.

The interface 900 can also include a follow option 904. The follow option 904 can be selectable to allow a user to automatically rebalance when the owner rebalances the portfolio. The follow option 904 can also allow a user to follow changes made to another portfolio of choice. Thus, users can copy, clone, and/or follow one or more portfolios via interface 900.

A trustless leader-follower application is a mechanism which automatically "copies" or "mimics" the actions of one trustless portfolio onto another, without the former taking custody of the latter. One of the challenges addressed by the leader-follower application involves the issue that many investors either lack the ability or time to determine what assets are good investments. Such assets could include stocks, bonds, digital currencies, blockchain assets, commodities, and many other types of assets. Therefore, many individual investors outsource the management of their investment decisions (and the execution of investments) to the professional asset management industry. This can include financial advisors, hedge funds, mutual fund managers, and many other types of investment managers.

An example pertaining to non-digital assets, stocks or bonds can be as follows. A lot of the regulation that exists on a national basis does not allow people to buy foreign stocks unless they are listed on a certain exchange using an ADR, or American Depository Receipt. This is essentially a reflection or a listing of that stock in the American markets. If a person wants to buy small or mid-cap stocks or some other esoteric asset in another country or jurisdiction, the amount of inefficiency and cost that the person is going to face in doing so is large. There are also limits on the amount that the person can buy. However, with the blockchain-based smart contract approaches and concepts disclosed herein, the technology could enable an easy purchase of such foreign assets. The disclosed concepts can enable micro payments with great fluidity of value transfer on a global basis, as well as significant freedom, lower costs and higher security.

When individuals deposit their money with financial firms, they are exposed to a well-known set of risks. One of those risks is custodial risk, defined by the fact that the individual is no longer in possession of their own funds and has elected another legal entity—the firm—to be the custodian of those funds. This decision creates a risk for the customer because the custodian could intentionally or unintentionally lose/steal those funds. Historically, some of the ways custodians have lost customer funds include but are not limited to: (1) fraud, (2) negligence of the custodians, (3) improper or erroneous accounting, and/or (4) domiciling of those funds in high risk country which seizes those funds for political reasons.

Individuals must choose whom to "trust" as the custodian of their funds. Often, it can take decades for a firm to build trust and develop a good reputation. However, this trust comes with a cost. The cost is an entire array of infrastructural processes designed to prove to others (clients, regulators, employees, etc.) that they are acting in good faith as custodians of their clients' money. Some of those infrastructural items include but are not limited to: (1) regular accounting and audits by reputable firms, (2) a corporate governance and legal structure designed to both adhere to local regulations and properly incentive the management, and/or (3) building up a track-record within the industry of competence, integrity, and good will. Reducing and even eliminating the cost of this trust is achieved with the leader-follower aspect of this disclosure.

When one user follows another user's portfolio, that user authorizes the user's portfolio to receive "rebalancing" instructions from the other portfolio; that is, one user is the follower and the other user is the leader. The leader portfolio is only authorized to send rebalancing instructions to the follower portfolio and not, for example, ask the contract to settle, remove the collateral from the contract, change the settlement address, or a whole number of other actions that are reserved just for the follower. There may be any number of parameters or functions that can be programmed into the contract that the followers can follow. Such as when to close the contract, and so forth, based on the leader functions performed. The leader-follower functionality can be a feature programmed into the smart contract 206. The leader-follower mechanism is a set of functions programmed into a blockchain-based smart-contract that allow the follower portfolio to receive instructions from the leader portfolio. One example of instructions can include cryptographically secure messages sent via a blockchain network from the leader's portfolio to the follower's portfolio. These messages contain the information for the follower's portfolio to rebalance to match that of the leader's portfolio, without the leader ever taking custody or being able to seize the funds of the follower.

Blockchain asset portfolio information from various users can be used to create leadership tables and rankings. For example, the system can use portfolio performance information to post leaderboards on a daily, weekly, and monthly basis. FIG. 10 illustrates an example interface 1000 of a leaderboard. Leaderboards can allow users to "follow" specific "portfolio managers" with just a few clicks as described above.

Interface 1000 can display portfolio owners 1002 and portfolio data 1004, 1006, 1008, 1010, 1012 for corresponding portfolios. The portfolio data 1004, 1006, 1008, 1010, 1012 can include, for example, one or more portfolios or portfolio descriptions, a portfolio return value, a portfolio weekly return value, a portfolio monthly return value, a portfolio yearly return value, etc. The portfolio data 1004, 1006, 1008, 1010, 1012 can pertain to a single portfolio associated with a respective owner or a group of portfolios associated with the respective owner. Moreover, a portfolio associated with the portfolio data 1004, 1006, 1008, 1010, 1012 can include multiple assets, which can be homogeneous assets (i.e., same type of assets) or heterogeneous assets (i.e., different types of assets).

In some cases, the portfolio data 1004, 1006, 1008, 1010, 1012 can include more or less information, such as asset information, portfolio parameters, etc. The portfolio owners 1002 and/or portfolio data 1004, 1006, 1008, 1010, 1012 can be user-selectable. Thus, users can select a particular field or value to interact with that field or value. For example, in some cases, users can select a user from the portfolio owners 1002 to clone or follow the portfolio associated with that user. Thus, a user can review the portfolio owners 1002 and portfolio data 1004, 1006, 1008, 1010, 1012 and select portfolios to follow or clone based on the data provided in the interface 1000.

The portfolio data 1004, 1006, 1008, 1010, 1012 can also be selected by a user to drill down on the associated data. For example, portfolio data 1004 can display a portfolio or portfolio description of a respective owner. The user can select the portfolio data 1004 to view additional details about that particular portfolio, such as portfolio parameters, user preferences, portfolio statistics, portfolio assets, following information (e.g., how many users are following that particular portfolio, which users are following that particular portfolio, comments provided by users regarding that particular portfolio, etc.), notes from one or more users pertaining to that particular portfolio, portfolio historical data, etc.

The portfolios presented in the interface 1000 can be ranked or organized based on one or more factors, such as performance statistics, ratings, number of followers, consistency, type of assets, averages, values associated with the portfolio data 1006, 1008, 1010, 1012, etc. For example, the portfolios can be listed in order of performance based on one or more performance factors. As another example, the portfolios can be listed according to user rankings. In some cases, users can filter which portfolio owners 1002, portfolios, and/or portfolio data 1004, 1006, 1008, 1010, 1012 to view on interface 1000. For example, a user can filter interface 1000 to only display friends of the user (e.g., other users having a relationship or contact with the user), a selected list of users, a top number of users, users associated with a particular organization, users in a particular geographic location, etc. The user can also filter the interface 1000 based on other parameters or factors. For example, the user can filter the interface 1000 to only display portfolios having certain assets, portfolios that are older than a specific period of time, etc.

The leader/follower feature enabled by interface 1000 can allow users to apply different investment research processes to portfolio design and construction. For example, a user could create the following exchange traded fund (ETF)-like blockchain asset product: A market cap weighted portfolio of the top ten blockchain assets by market cap. Such a portfolio is like the Dow Jones of blockchain asset investments. It would automatically rebalance over some period for which a user could choose. The user could also create a version with the top 20 coins or the top 50 coins. Users could back-test and publish results of different portfolio compositions. This could also work for an inverse market cap ETF or for making a portfolio allocation that optimizes return vs volatility using modern portfolio management techniques. A leaderboard can present one or more of the following data: a pie chart (or other graphic) illustrating a distribution of assets, an owner, a portfolio name, a percentage of returns on a lifetime basis, weekly basis, monthly basis, yearly basis, or user-selectable basis. A user interaction with one of the portfolios (such as on a pie chart graphic) can return a detailed accounting of the assets and the percentage of the portfolio that has that respective asset.

In this way, users could create investment strategies and publish research which supports their portfolio composition, and share their portfolios as a trustless asset group for other users to follow. This leader/follower feature also enables other applications. For example, a user can employ a specific pattern to significantly reduce the chance of a hack on the private key of the user's portfolio while maintaining the flexibility to trade that portfolio from an "insecure" computer or network. The user can create a "hot" leader portfolio which has a negligible amount of value in it, for which the private key can be exposed carelessly. That "hot" portfolio would be the leader to the same user's "cold" portfolio which holds the main value of the portfolio, say $30 or 40k worth of digital assets. The private key to this "cold" portfolio would be generated in a secure environment and put in cold storage for the life of the portfolio. Since the hot/leader portfolio is only authorized to rebalance the cold/follower portfolio then if the "hot" key was compromised, the worst that an attacker could do is simply rebalance the user's hot portfolio but never steal the funds in the user's cold portfolio.

In other examples, active trading of portfolios can be provided by those skilled in such endeavors on behalf of those with limited skills. For example, assume a user has a friend who has had a lot of success trading, but the user is wary to let the friend trade a large number of coins due to legal, custodial, or accounting risks. With this pattern, the user can just follow that friend's portfolio without any of those risks.

In some cases, non-crypto assets can be provisioned by adding new oracle data feeds. For example, by connecting this technology to a Bloomberg terminal and corresponding execution infrastructure at a broker-dealer, hedge fund, investment bank, etc., different types of non-crypto assets can be provisioned as or for portfolios. To illustrate, users can add gold or other precious metals to their trustless portfolios. In this sense, those real-world assets could act as a trustless entry and exit mechanism for selling off entire exposures of blockchain assets should the user choose to do so. For example, the user liquidates an entire portfolio and moves to gold directly within their trustless portfolio on the blockchain. All of this is profound in that the system can have "fully reserved" digital assets collateralized with blockchain assets such as Ethereum.

The global derivatives industry is vast with over a quadrillion dollars in outstanding contracts and hundreds of different types of derivatives like swaps, options, CDS, exotics and many more. In the traditional financial system, almost all consumer and business financing activities are in some way attached to a financial derivative, whether that be a credit card or mortgage (CDS and interest rate swaps), activities in the CFO's office of a fortune 500 (FX currency swaps and futures), or the trading operations at a large exchange (risk management and hedging). This branch of financial engineering can be combined with the disclosed blockchain technologies and smart contracts to produce consumer financial products that cost less, eliminate intermediaries, increase security, and provide entirely new services, such as the trustless portfolio service described herein.

The smart contract disclosed herein can apply to legal contracts as well. For example, the smart contract herein can be applied to insurance contracts, business contracts, specific performance contracts, buying or selling a product or services, and so forth. Indeed, the procedures, components and systems disclosed herein can apply to any kind of contract. Any kind of blockchain technology can also be implemented or combined with the concepts disclosed herein. In fact, the technologies disclosed herein are blockchain agnostic and can be implemented with any future blockchain technologies.

Figure 11:
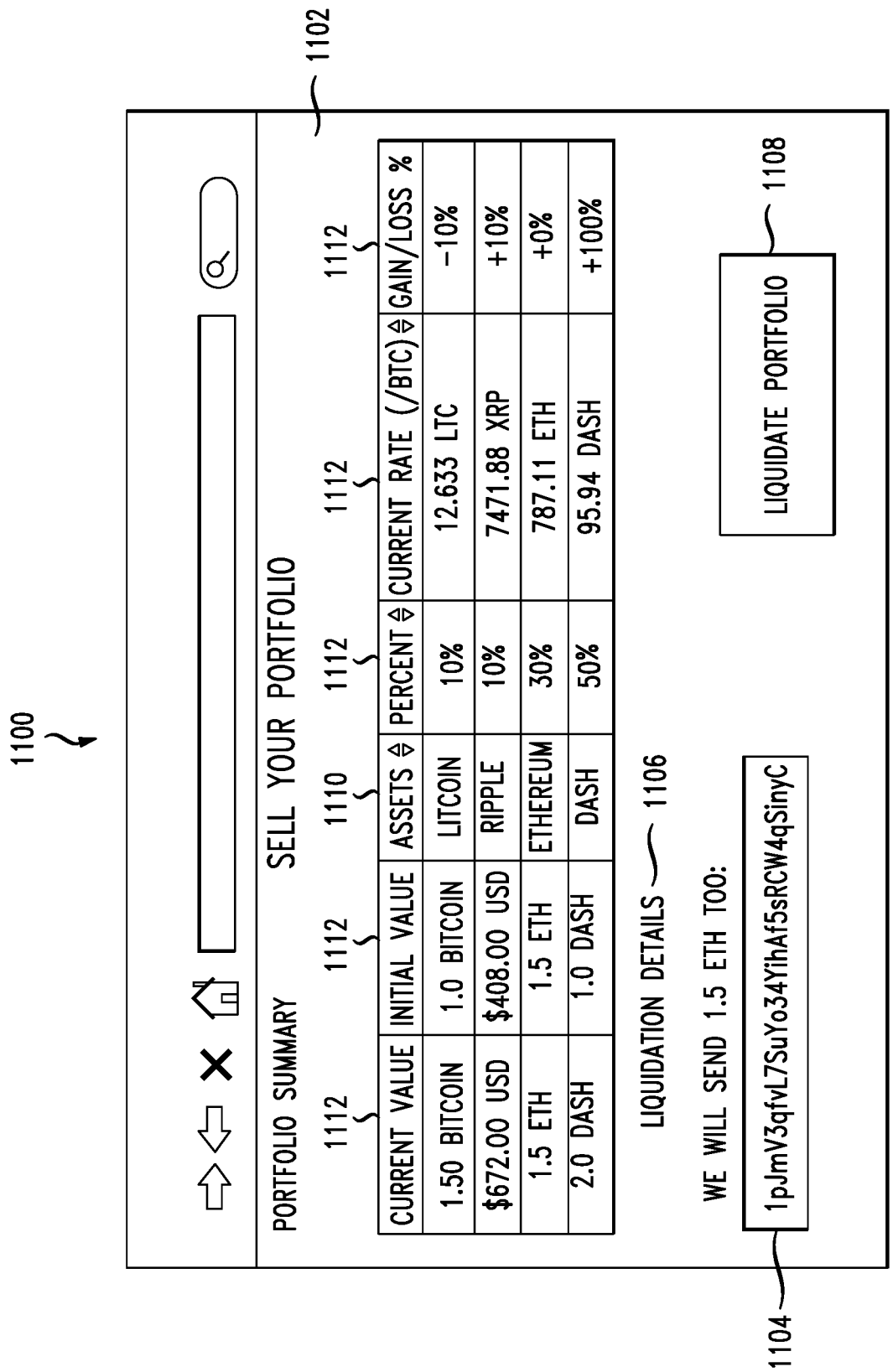
FIG. 11 illustrates an example graphical interface for liquidating a portfolio of assets.

FIG. 11 illustrates an example interface 1100 for selling a portfolio of assets. The interface 1100 can include a summary view 1102 which can display assets 1110 and corresponding asset data 1112. Example assets 1110 can include, without limitation, Litcoin, Ripple, Ethereum, Dash, Bitcoin, and/or any other crypto and non-crypto assets. The asset data 1112 can include an initial value (e.g., value at time of purchase), a current value, a percent of the total portfolio investment or value, a current rate, a performance (e.g., gain, loss, etc.), and so forth.

The interface 1110 can also include a liquidation details area 11106 which can indicate one or more assets from the assets 1110 being sold, purchased, traded, etc., an amount of the one or more assets being sold, purchased, traded, etc., an address or party involved in the liquidation transaction (e.g., buyer, seller, etc.), as well as other information associated with the transaction, such as comments or preferences. The interface 1110 can provide an address 1104 associated with the liquidation details. For example, the address 1104 can identify the address where the smart contract should send the assets.

The interface 1110 can include a control element 1108 configured to trigger or execute the liquidation when activated by a user. For example, the control element 1108 can be a button that the user can select to liquidate the portfolio presented or selected, initiate the liquidation operation, accept the liquidation operation, and/or otherwise complete the liquidation operation. The smart contract, upon the buyer liquidating the portfolio, calculates the various amounts that are to go to the respective buyer and seller and carries out the liquidation operation based on the calculated amounts and the smart contract instructions.

The interface 1110 can allow a user to liquidate an entire portfolio or a selected subset of assets in the portfolio. In some cases, the interface 1110 can also allow the user to liquidate a group of portfolios. The user's specific preferences vis-à-vis which assets and/or portfolio(s) to liquidate can be specified via the liquidation details area 11106, for example.

Figure 12A:
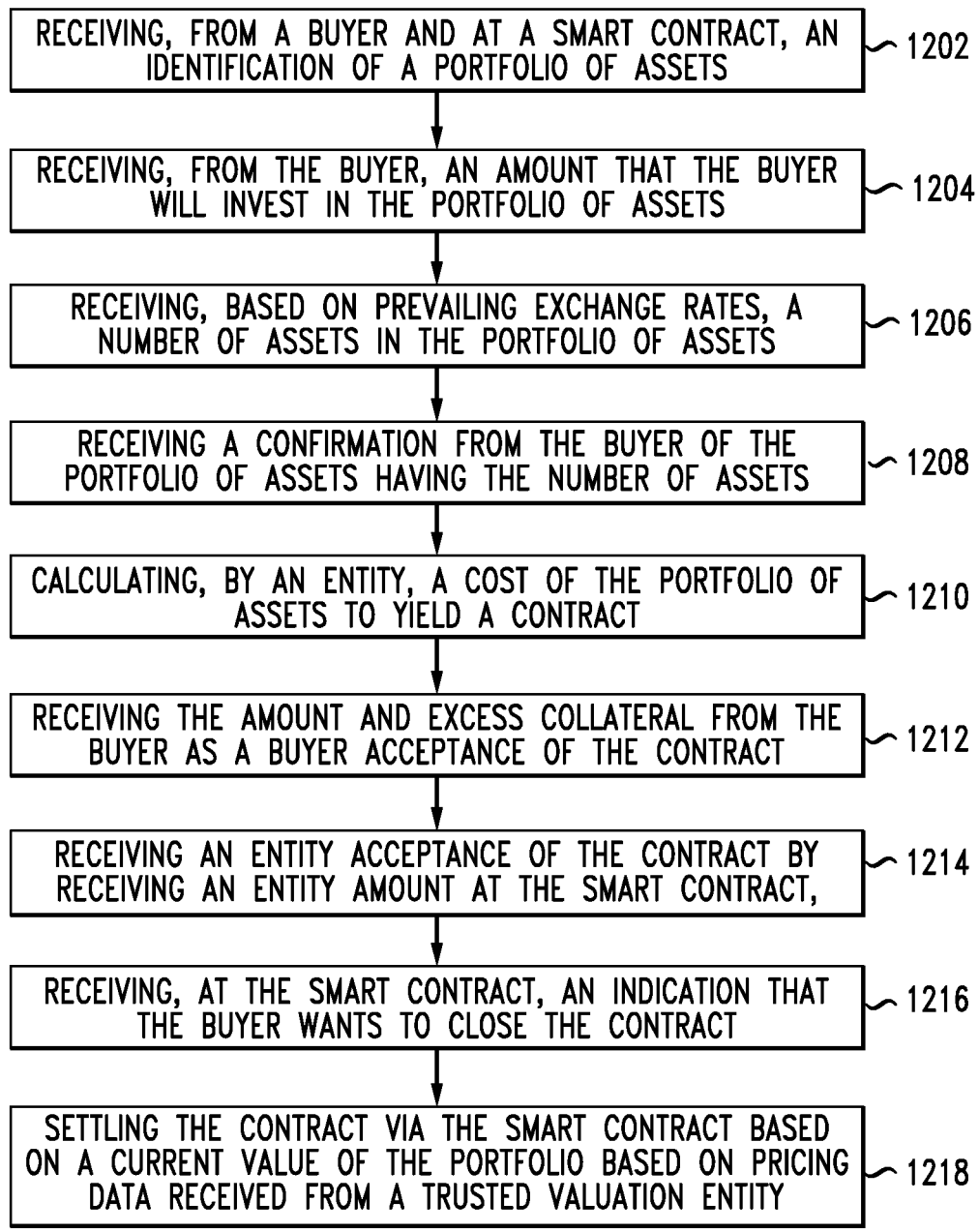
FIGS. 12A and 12B illustrate example methods for managing a portfolio of assets using a blockchain-based smart contract.

FIG. 12A illustrates an example method for asset management in accordance with various aspects of the present technologies. FIG. 12A focuses on the operations of the smart contract, as opposed to the separate operations of the oracle, rebalancing component, leader/follower component, and so forth.

In this example, the method includes receiving, from a buyer and at a smart contract, an identification of a portfolio of assets (1202). Blockchain assets are one example of such assets. Insurance contract, stocks, bonds, commodities, real estate, intellectual property, legal contracts, etc., are examples of other types of assets. The portfolio can include various types of assets, including various types of blockchain and/or non-blockchain assets. Moreover, the smart contract can be implemented in a blockchain, as previously described. The identification of the portfolio of assets can include a respective percentage of each type of asset to enter into the portfolio of assets.

The method includes receiving, from the buyer, an amount that the buyer will invest in the portfolio of assets (1204). The amount can be any amount specified by the buyer for investing in the portfolio. The amount the buyer will invest can include the current value of the assets. In some cases, the amount can be in cryptocurrency, such as Bitcoin or Ethereum.

The method also includes receiving, based on one or more exchange rates (e.g., prevailing exchange rates) and the amount being invested by the buyer, a number of assets in the portfolio of assets (1206). The number of assets can be the number of assets in the portfolio as calculated based on the amount the buyer is investing and the one or more exchange rates.

The method includes receiving a confirmation from the buyer of the portfolio of assets having the number of assets (1208). The confirmation can indicate that the buyer agrees with or validates the portfolio with the number of assets. The method includes calculating, by an entity, a cost of the portfolio of assets to yield a contract (1210). The entity can be, for example a seller of the portfolio of assets.

The method further includes receiving the amount and/or excess collateral from the buyer as a buyer acceptance of the contract (1212). For example, the method can include receiving the amount invested by the buyer and excess collateral as a buyer acceptance of the contract. Moreover, the method includes receiving an entity acceptance of the contract by receiving an entity amount at the smart contract (1214). The entity can sign the entity acceptance using one or more entity signature keys for the contract, which can include, for example, private keys of a sending address associated with the entity.

In some cases, after receiving the entity acceptance, the method can include the entity purchasing the underlying assets that make up the portfolio of assets from one or more exchanges and holding the underlying assets.

The method can also include receiving, at the smart contract, an indication that the buyer wants to close the contract (1216). The buyer can send the indication to the smart contract to initiate the closing of the contract. In some cases, the buyer can sign the indication or a message including the indication. For example, the buyer can send the indication via a message signed by the buyer using a buyer private key. The method then includes settling the contract via the smart contract based on a current value of the portfolio (1218). The settling of the contract can be triggered by the indication that the buyer wants to close the contract. Thus, the buyer can control the settlement of the contract and request the settling when desired by the buyer. The current value of the portfolio can be calculated based on pricing data received from a trusted valuation entity.

In some cases, a private key can hold the entire portfolio through the smart contract. Moreover, there is no need for multiple wallets to manage multiple blockchain assets. Thus, the buyer can manage the portfolio containing various types of blockchain assets without having to maintain a respective wallet for each type of blockchain asset.

Settling the contract via the smart contract can include calculating, via the smart contract, the current value of the portfolio and calculating a collateral amount and resulting proceeds to be sent to the buyer and the entity. The method can include sending a first resulting value from the resulting proceeds to the buyer and a second resulting value from the resulting proceeds to the entity. In some examples, the first resulting value can represent an original investment amount, plus a profit, plus an original excess collateral amount, and/or minus a commission. The second resulting value can include a difference from the original investment amount, minus a loss, plus the original excess collateral amount, and/or plus the commission.

In some cases, after receiving, at the smart contract, the indication that the buyer wants to close the contract, the entity can sell the portfolio of assets on an exchange. Moreover, in some cases, prior to receiving, at the smart contract, the indication that the buyer wants to close the contract, the method can include receiving a rebalancing request which indicates that the buyer wants to rebalance the portfolio of assets. The method can include receiving a new portfolio composition from the buyer based on the rebalancing request, calculating a new portfolio value and a new collateral value based on the new portfolio composition and data from the trusted valuation entity, and accepting the new portfolio composition by the entity.

As part of this process, the method can include determining whether additional collateral is needed according to a collateral limit for the contract and receiving a confirmation of the new portfolio composition by the buyer and the entity. In some examples, the confirmation can be received via a buyer signed message from the buyer and an entity signed message from the entity. In some cases, the entity can buys or sell a mirror image of what the buyer bought and sold during a rebalancing of the contract.

Figure 12B:
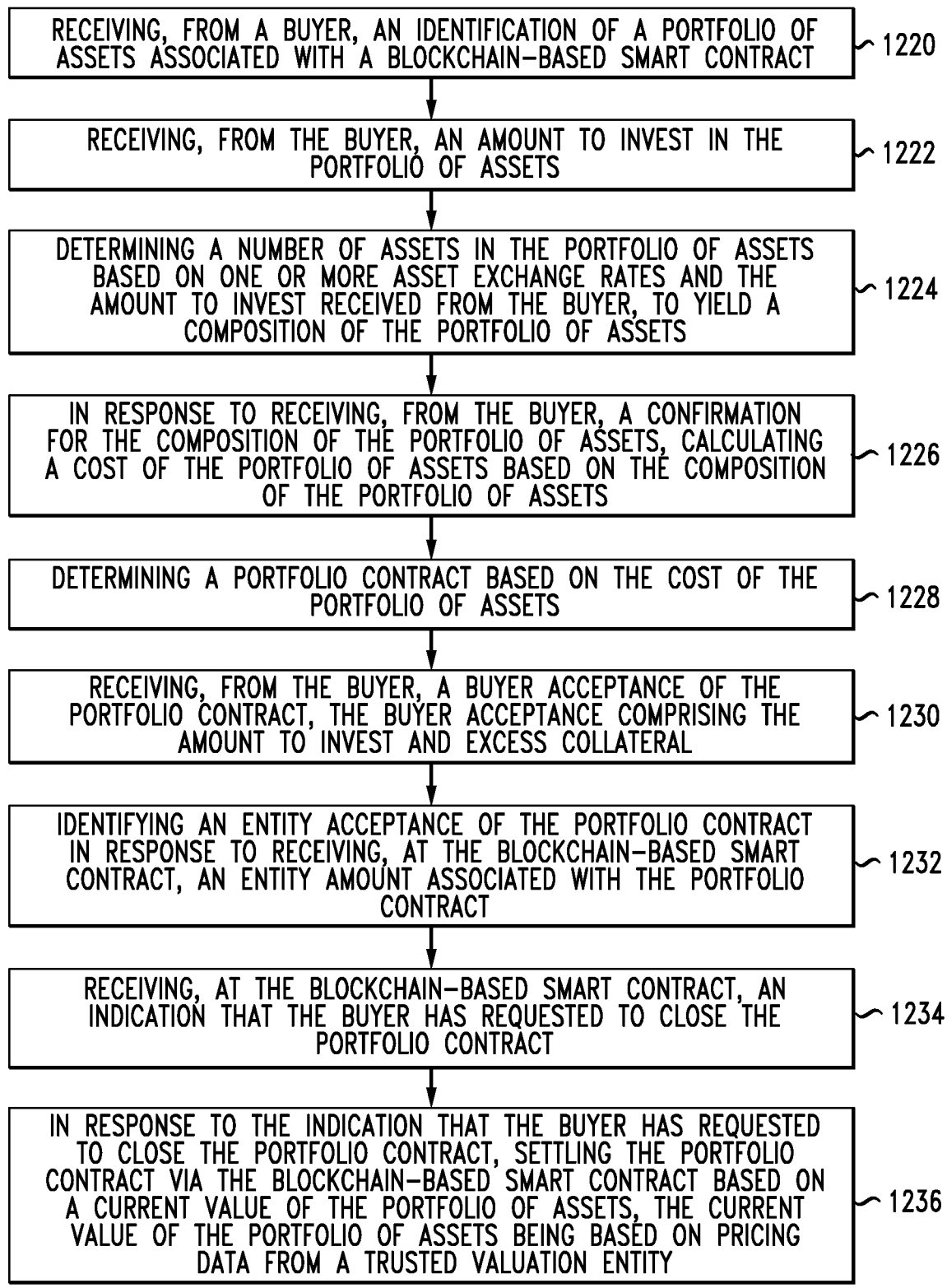

FIG. 12B illustrates another method. The method includes receiving, from a buyer, an identification of a portfolio of assets associated with a blockchain-based smart contract (1220), receiving, from the buyer, an amount to invest in the portfolio of assets (1222) and determining a number of assets in the portfolio of assets based on one or more asset exchange rates and the amount to invest received from the buyer, to yield a composition of the portfolio of assets (1224).

In response to receiving, from the buyer, a confirmation for the composition of the portfolio of assets, the method includes calculating a cost of the portfolio of assets based on the composition of the portfolio of assets (1226), determining a portfolio contract based on the cost of the portfolio of assets (1228), receiving, from the buyer, a buyer acceptance of the portfolio contract, the buyer acceptance comprising the amount to invest and excess collateral (1230), identifying an entity acceptance of the portfolio contract in response to receiving, at the blockchain-based smart contract, an entity amount associated with the portfolio contract (1232) and receiving, at the blockchain-based smart contract, an indication that the buyer has requested to close the portfolio contract (1234).

In response to the indication that the buyer has requested to close the portfolio contract, the method can include settling the portfolio contract via the blockchain-based smart contract based on a current value of the portfolio of assets, the current value of the portfolio of assets being based on pricing data from a trusted valuation entity (1236). The portfolio of assets can include blockchain assets to yield a portfolio of blockchain assets. The identification of the portfolio of blockchain assets can include a respective percentage of each type of blockchain asset to enter into the portfolio of blockchain assets. The amount to invest can include an amount of at least one of Bitcoins, Ethereum, a cryptocurrency, and another blockchain asset. The amount to invest can also include a first amount in a currency or a second amount representing a physical asset. The acceptance can be associated with an entity, the entity being a seller of the portfolio of assets. Settling the portfolio contract can include calculating, via the blockchain-based smart contract, the current value of the portfolio of assets, a collateral amount, and resulting proceeds to be sent to the buyer and an entity associated with the entity acceptance. The resulting proceeds can include a first resulting value and a second resulting value. In this regard, the method can further include sending the first resulting value to the buyer and the second resulting value to the entity, the first resulting value including an original investment amount, plus a profit, plus an original excess collateral amount, and minus a commission, and the second resulting value including a difference from the original investment amount, minus a loss, plus the original excess collateral amount plus the commission.

The method can further include, after receiving the indication that the buyer has requested to close the portfolio contract, selling the portfolio of assets on an exchange. The method can also include, prior to receiving the indication that the buyer has requested to close the portfolio contract, receiving a rebalancing request indicating that the buyer has requested to rebalance the portfolio of assets, receiving a new portfolio composition from the buyer based on the rebalancing request, calculating a new portfolio value and a new collateral value based on the new portfolio composition and data from the trusted valuation entity, accepting the new portfolio composition by an entity associated with the entity acceptance of the portfolio contract, determining whether additional collateral is needed according to a collateral limit for the portfolio contract and receiving a second confirmation of the new portfolio composition by the buyer and the entity via a buyer signed message from the buyer and an entity signed message from the entity.

The method can further include providing, to the entity, a rebalancing fee prior to the accepting of the new portfolio composition by the entity. The entity can buy or sell a mirror image of assets bought and sold by the buyer during a rebalancing of the portfolio contract.

The indication that the buyer wants to close the contract can be received via a signed message from a buyer private key, and wherein the entity acceptance is received along with entity signature keys comprising private keys of a sending address of an entity associated with the entity acceptance.

Example embodiments of the concepts disclosed herein can include a computer-readable storage device. The computer-readable storage device is a man-made physical device such as RAM, ROM, a hard drive, optical drive, or any other storage or memory device that can store instructions, data, and/or computer-executable code. The instructions, data, and/or computer-executable code can be executed by one or more processors, which can cause the one or more processors to perform operations including any one or more steps or processes disclosed herein. The computer-readable storage device excludes signals per se and the like.

The present examples are to be considered as illustrative and not restrictive, and the examples is not to be limited to the details given herein, but may be modified within the scope of the appended claims.

Claim language reciting "at least one of" a set indicates that one member of the set or multiple members of the set satisfy the claim. For example, claim language reciting "at least one of A and B" means A, B, or A and B. Use of the terms "at least one of" to describe a list of items separated by the term "and" should not be interpreted to mean that the list requires one of each item in the list, but rather that the list includes at least one item in the list, which can be any item or number of items in the list, such as the full set of items in the list, a subset of items in the list, or a single item in the list.

Statements of the disclosure include:

Statement 1: A method comprising: receiving, from a buyer, an identification of a portfolio of assets associated with a blockchain-based smart contract; receiving, from the buyer, an amount to invest in the portfolio of assets; determining a number of assets in the portfolio of assets based on one or more asset exchange rates and the amount to invest received from the buyer, to yield a composition of the portfolio of assets; in response to receiving, from the buyer, a confirmation for the composition of the portfolio of assets, calculating a cost of the portfolio of assets based on the composition of the portfolio of assets; determining a portfolio contract based on the cost of the portfolio of assets; receiving, from the buyer, a buyer acceptance of the portfolio contract, the buyer acceptance comprising the amount to invest and excess collateral; identifying an entity acceptance of the portfolio contract in response to receiving, at the blockchain-based smart contract, an entity amount associated with the portfolio contract; receiving, at the blockchain-based smart contract, an indication that the buyer has requested to close the portfolio contract; and in response to the indication that the buyer has requested to close the portfolio contract, settling the portfolio contract via the blockchain-based smart contract based on a current value of the portfolio of assets, the current value of the portfolio of assets being based on pricing data from a trusted valuation entity.

Statement 2: The method according to Statement 1, wherein the portfolio of assets comprises blockchain assets.

Statement 3: The method according to Statement 1 or Statement 2, wherein the identification of the portfolio of assets comprises a respective percentage of each type of asset to enter into the portfolio of assets.

Statement 4: The method according to any one of Statements 1 to 3, wherein the amount to invest comprises an amount of at least one of Bitcoins, Ethereum, a cryptocurrency, and another blockchain asset.

Statement 5: The method according to any one of Statements 1 to 4, wherein the amount to invest comprises a first amount in a currency or a second amount representing a physical asset.

Statement 6: The method according to any one of Statements 1 to 5, wherein the entity acceptance is associated with an entity, the entity being a seller of the portfolio of assets.

Statement 7: The method according to any one of Statements 1 to 6, wherein settling the portfolio contract further comprises calculating, via the blockchain-based smart contract, the current value of the portfolio of assets, a collateral amount, and resulting proceeds to be sent to the buyer and an entity associated with the entity acceptance.

Statement 8: The method according to any one of Statements 1 to 7, wherein the resulting proceeds comprise a first resulting value and a second resulting value, the method further comprising: sending the first resulting value to the buyer and the second resulting value to the entity, the first resulting value comprising an original investment amount, plus a profit, plus an original excess collateral amount, and minus a commission, and the second resulting value comprising a difference from the original investment amount, minus a loss, plus the original excess collateral amount plus the commission.

Statement 9: The method according to any one of Statements 1 to 8, further comprising: after receiving the indication that the buyer has requested to close the portfolio contract, selling the portfolio of assets on an exchange.

Statement 10: The method according to any one of Statements 1 to 9, further comprising prior to receiving the indication that the buyer has requested to close the contract: receiving a rebalancing request indicating that the buyer has requested to rebalance the portfolio of assets; receiving a new portfolio composition from the buyer based on the rebalancing request; calculating a new portfolio value and a new collateral value based on the new portfolio composition and data from the trusted valuation entity; accepting the new portfolio composition by an entity associated with the entity acceptance of the portfolio contract; determining whether additional collateral is needed according to a collateral limit for the portfolio contract; and receiving a second confirmation of the new portfolio composition by the buyer and the entity via a buyer signed message from the buyer and an entity signed message from the entity.

Statement 11: The method according to any one of Statements 1 to 10, further comprising providing, to the entity, a rebalancing fee prior to the accepting of the new portfolio composition by the entity.

Statement 12: The method according to any one of Statements 1 to 11, wherein the entity buys or sells a mirror image of assets bought and sold by the buyer during a rebalancing of the portfolio contract.

Statement 13: The method according to any one of Statements 1 to 12, wherein the indication that the buyer wants to close the contract is received via a signed message from a buyer private key, and wherein the entity acceptance is received along with entity signature keys comprising private keys of a sending address of an entity associated with the entity acceptance.

Statement 14: A system comprising one or more processors and at least one computer-readable storage device having stored therein instructions which, when executed by the one or more processors, cause the one or more processors to perform a method according to any one of Statements 1 to 13.

Statement 14: At least one computer-readable storage device having stored therein instructions which, when executed by the one or more processors, cause the one or more processors to perform a method according to any one of Statements 1 to 13.

Statement 15: A system comprising means for performing a method according to any one of Statements 1 to 13.

What is claimed is:

1. A method for a decentralized trustless blockchain asset swap, the method comprising:
   receiving, from a buyer, an identification of a portfolio of blockchain assets to swap for exposure against a funding blockchain asset;
   receiving, from the buyer, a buyer amount of the funding blockchain asset;
   determining a number of assets in the portfolio of blockchain assets based on one or more blockchain asset exchange rates and the buyer amount of the funding blockchain asset to yield a composition of the portfolio of assets;
   calculating a cost of the portfolio of blockchain assets based at least on the composition of the portfolio of blockchain assets;
   creating a portfolio swap smart contract on a blockchain based on the cost and composition of the portfolio of blockchain assets, the portfolio swap smart contract binding the buyer and the seller to share a payout in the funding blockchain asset based on a value of the portfolio of blockchain assets upon closing of the portfolio swap smart contract;
   receiving, via the blockchain, a buyer acceptance of the portfolio swap smart contract, the buyer acceptance comprising sending of the cost of the portfolio of blockchain assets in the funding blockchain asset to the portfolio swap smart contract; and
   accepting the portfolio swap smart contract by sending a seller amount of the funding blockchain asset to the portfolio swap smart contract.

2. The method of claim 1, further comprising:
   receiving an indication that the buyer has requested to settle the portfolio swap smart contract; and
   receiving a proportionate share of the payout in the funding blockchain asset based on a current value of the portfolio of blockchain assets, the current value of the portfolio of blockchain assets being based on pricing data from an oracle.

3. The method of claim 1, wherein the cost of the portfolio of blockchain assets includes a closing fee for a seller of the portfolio swap smart contract.

4. The method of claim 1, further comprising:
invest presenting a user interface to the buyer, the user interface displaying assets available for identification in the portfolio of blockchain assets.

5. The method of claim 1, wherein at least one of the assets in the portfolio of blockchain assets is a contract for difference (CFD) of a real-world economic indicator.

6. The method of claim 1, wherein the portfolio swap smart contract automatically settles when the proportionate share of the payout equals the buyer amount plus the seller amount of the funding blockchain asset.

7. The method of claim 1, further comprising:
triggering a settlement of the portfolio swap smart contract based on the submission of a blockchain transaction to a network of the smart contract.

8. The method of claim 1, wherein the
payout represents equal and opposite positions taken by the buyer and the seller with respect to a price of the portfolio of blockchain assets.

9. The method of claim 1, further comprising:
hedging exposure to the portfolio of blockchain assets by purchasing and holding at least a portion of the portfolio of blockchain assets independent of the portfolio swap smart contract.

10. The method of claim 1, further comprising:
publishing a leaderboard of a plurality of portfolio swap smart contracts, each of the plurality being associated with an identity of a buyer.

11. The method of claim 10, wherein the leaderboard includes an invitation to clone an existing portfolio swap smart contract.

12. The method of claim 11, wherein the invitation to clone the existing portfolio includes automatically rebalancing the portfolio of blockchain assets according to the existing portfolio swap smart contract.

13. The method of claim 1, wherein the payout includes a fixed leg and a floating leg of the portfolio swap smart contract.

14. A system for managing a decentralized trustless blockchain asset swap comprising:
one or more processors; and
a computer-readable medium, storing instructions which, when executed by the one or more processors, cause the one or more processors to perform operations comprising:
receiving, from a buyer, an identification of a portfolio of blockchain assets to swap for exposure against a funding blockchain asset;
receiving, from a buyer, a buyer amount of the funding blockchain asset;
determining a number of assets in the portfolio of assets based on one or more asset exchange rates and the buyer amount of the funding blockchain asset to yield a composition of the portfolio of blockchain assets;
calculating a cost of the portfolio of blockchain assets;
creating a portfolio swap smart contract on a shared ledger based on the cost and composition of the portfolio of blockchain assets, the portfolio swap smart contract binding the buyer and the seller to share a payout in the funding blockchain asset based on a value of the portfolio of blockchain assets upon closing of the portfolio swap smart contract;
receiving, via the blockchain, a buyer acceptance of the portfolio swap smart contract, the buyer acceptance comprising sending of the cost of the portfolio of blockchain assets in the funding blockchain asset to the portfolio swap smart contract; and
accepting the portfolio swap smart contract by sending a seller amount of the funding blockchain asset to the portfolio swap smart contract.

15. The system of claim 14, wherein the instructions when executed by the one or more processors, further cause the one or more processors to:
receive an indication that the buyer has requested to settle the portfolio swap smart contract; and
receive a proportionate share of the payout in the funding blockchain asset based on a current value of the portfolio of blockchain assets, the current value of the portfolio of blockchain assets being based on pricing data from an oracle.

16. The system of claim 14, wherein the payout represents equal and opposite positions taken by the buyer and the seller with respect to a price of the portfolio of blockchain assets.

17. A non-transitory computer-readable storage device storing instructions which, when executed by at least one processor, cause the at least one processor to perform operations comprising:
receiving, from a buyer, an identification of a portfolio of blockchain assets to swap for exposure against a funding blockchain asset;
receiving, from the buyer, a buyer amount of the funding blockchain asset;
determining a number of assets in the portfolio of blockchain assets based on one or more blockchain asset exchange rates and the buyer amount of the funding blockchain asset to yield a composition of the portfolio of assets;
calculating a cost of the portfolio of blockchain assets based at least on the composition of the portfolio of assets;
creating a portfolio swap smart contract on a blockchain based on the cost and composition of the portfolio of blockchain assets;
receiving, via the blockchain, a buyer acceptance of the portfolio swap smart contract, the buyer acceptance comprising the sending of the cost of the portfolio of blockchain assets in the funding blockchain asset to the portfolio swap smart contract; and
accepting the portfolio swap smart contract by sending a seller amount of the funding blockchain asset to the portfolio swap smart contract.

18. The non-transitory computer-readable storage device of claim 17, storing instructions which, when executed by the at least one processor, cause the at least one processor to perform operations comprising:
receive an indication that the buyer has requested to settle the portfolio swap smart contract; and
receive a proportionate share of the payout in the funding blockchain asset based on a current value of the portfolio of blockchain assets, the current value of the portfolio of blockchain assets being based on pricing data from an oracle.

19. The non-transitory computer-readable storage device of claim 18,
wherein at least one of the assets in the portfolio of blockchain assets is a contract for difference (CFD) of a real-world economic indicator.

20. The non-transitory computer-readable storage device of claim 17, wherein the portfolio swap smart contract automatically settles when the proportionate share of the payout equals the buyer amount plus the seller amount of the funding blockchain asset.

* * * * *